US012673336B2

(12) United States Patent
Sakata et al.

(10) Patent No.: US 12,673,336 B2
(45) Date of Patent: Jul. 7, 2026

(54) TRIGGER-TYPE LIQUID SPRAYER

(71) Applicant: YOSHINO KOGYOSHO CO., LTD., Tokyo (JP)

(72) Inventors: Kota Sakata, Tokyo (JP); Kotaro Fujiwara, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 309 days.

(21) Appl. No.: 18/037,349

(22) PCT Filed: Nov. 11, 2021

(86) PCT No.: PCT/JP2021/041557
§ 371 (c)(1),
(2) Date: May 17, 2023

(87) PCT Pub. No.: WO2022/113752
PCT Pub. Date: Jun. 2, 2022

(65) Prior Publication Data

US 2024/0009693 A1 Jan. 11, 2024

(30) Foreign Application Priority Data

Nov. 30, 2020 (JP) ................................ 2020-199142
Dec. 25, 2020 (JP) ................................ 2020-217409

(51) Int. Cl.
*B05B 11/10* (2023.01)

(52) U.S. Cl.
CPC ........ *B05B 11/104* (2023.01); *B05B 11/1057* (2023.01); *B05B 11/1097* (2023.01)

(58) Field of Classification Search
CPC ............... B05B 11/104; B05B 11/1057; B05B 11/1097

(Continued)

(56) References Cited

U.S. PATENT DOCUMENTS 4,858,788 A * 8/1989 Meckenstock ........ B05B 9/0883 222/207
5,704,550 A * 1/1998 Foster .................. B05B 1/3452 239/480

(Continued)

FOREIGN PATENT DOCUMENTS

CN 110536756 A 12/2019
CN 111822180 A 10/2020

(Continued)

OTHER PUBLICATIONS

Dec. 21, 2021 International Search Report issued in International Patent Application No. PCT/JP2021/041557.

(Continued)

*Primary Examiner* — Chee-Chong Lee
(74) *Attorney, Agent, or Firm* — Oliff PLC

(57) ABSTRACT

A trigger-type liquid sprayer includes a vertical supply tube, a reservoir cylinder into which a liquid that has passed through the inside of the vertical supply tube is supplied, and a reservoir plunger disposed inside the reservoir cylinder and configured to move toward one side in an axial direction in response to supply of a liquid into the reservoir cylinder while being biased toward the other side, and the vertical supply tube has a recovery path disposed in a rear end portion of the vertical supply tube, extending downward from the reservoir cylinder, and having a lower end portion closed from below, a communication path extending in a circumferential direction of the vertical supply tube from the recovery path, and a communication opening disposed in front of the recovery path and configured to allow the communication path and an inside of a container body to communicate with each other.

8 Claims, 12 Drawing Sheets

(58) Field of Classification Search
USPC .......................................................... 239/526
See application file for complete search history.

(56) References Cited

U.S. PATENT DOCUMENTS

| | | | | | |
|---|---|---|---|---|---|
| 6,131,820 | A * | 10/2000 | Dodd | B05B 11/1011 | 239/492 |
| 6,641,003 | B1 * | 11/2003 | Foster | B05B 11/007 | 222/383.1 |
| 2014/0069962 | A1 * | 3/2014 | Dennis | B05B 11/0056 | 222/382 |
| 2016/0016188 | A1 * | 1/2016 | Spang | B05B 11/1023 | 53/410 |
| 2018/0369842 | A1 * | 12/2018 | Kakuta | B05B 11/1066 | |

FOREIGN PATENT DOCUMENTS

| | | | |
|---|---|---|---|
| EP | 3805127 | A1 | 4/2021 |
| JP | 2014-166624 | A | 9/2014 |
| JP | 2014-213296 | A | 11/2014 |
| JP | 2017-080725 | A | 5/2017 |
| JP | 2017-213497 | A | 12/2017 |
| JP | 2019-177897 | A | 10/2019 |
| JP | 2019-209999 | A | 12/2019 |
| WO | 2019/230602 | A1 | 12/2019 |

OTHER PUBLICATIONS

Apr. 26, 2025 Office Action issued in Chinese Patent Application No. 202180078448.3.

* cited by examiner

TRIGGER-TYPE LIQUID SPRAYER

TECHNICAL FIELD

The present invention relates to a trigger-type liquid sprayer.

Priority is claimed on Japanese Patent Application No. 2020-199142, filed Nov. 30, 2020, and Japanese Patent Application No. 2020-217409, filed Dec. 25, 2020, the contents of which are incorporated herein by reference.

BACKGROUND ART

A trigger-type liquid sprayer includes a nozzle member having a spray hole for spraying a liquid forward, and a sprayer main body.

The sprayer main body includes a reservoir cylinder into which a liquid that has passed through the inside of a vertical supply tube is supplied in response to rearward movement of a trigger portion, and a reservoir plunger disposed inside the reservoir cylinder to be movable in an axial direction along a center axis of the reservoir cylinder, and configured to move rearward in response to supply of the liquid into the reservoir cylinder while being biased forward by a bias member (for example, refer to Patent Document 1).

A recovery path extending downward from the reservoir cylinder is provided in a rear end portion of the vertical supply tube. A lower end portion of the recovery path has an opening section opening inside a container body.

CITATION LIST

Patent Document

[Patent Document 1]

Japanese Unexamined Patent Application, First Publication No. 2017-213497

SUMMARY OF INVENTION

Technical Problem

When a trigger-type liquid sprayer in the related art is dropped or the like from a nozzle member side in an inverted posture and an impact force in an upward/downward direction such as a drop impact acts on the trigger-type liquid sprayer from the front, there is a possibility that a high load may be generated in a rear end portion of a vertical supply tube and breakage may occur in the vertical supply tube starting from a lower end portion (opening section) of a recovery path.

In the trigger-type liquid sprayer in the related art, in order to reinforce a front end portion of the vertical supply tube, a structure different from the vertical supply tube is provided integrally with the front end portion of the vertical supply tube, but this structure is not provided to the rear end portion of the vertical supply tube. For this reason, for example, when the trigger-type liquid sprayer is dropped in an inverted posture from a reservoir cylinder side and an impact force in the upward/downward direction such as a drop impact acts on the trigger-type liquid sprayer from behind, there is a possibility that a high load may be generated in the rear end portion of the vertical supply tube.

The present invention has been made in consideration of such circumstances, and an object thereof is to provide a trigger-type liquid sprayer in which the impact resistance can be improved.

Solution to Problem

According to an aspect of the present invention, there is provided a trigger-type liquid sprayer including a sprayer main body mounted on a container body configured to accommodate a liquid therein, and a nozzle member having a spray hole for spraying a liquid forward, the nozzle member being mounted on a front end portion of the sprayer main body, in which the sprayer main body includes a vertical supply tube extending in an upward/downward direction and configured to suck up a liquid in the container body, a trigger mechanism having a trigger portion disposed in front of the vertical supply tube to be movable rearward in a state in which the trigger portion is biased forward, the trigger mechanism being configured to cause the liquid to flow from an inside of the vertical supply tube toward the spray hole in response to rearward movement of the trigger portion, a reservoir cylinder into which a liquid that has passed through the inside of the vertical supply tube is supplied in response to rearward movement of the trigger portion, and a reservoir plunger disposed inside the reservoir cylinder to be movable in an axial direction along a center axis of the reservoir cylinder, and configured to move toward one side in the axial direction in response to supply of the liquid into the reservoir cylinder while being biased toward the other side in the axial direction by a bias member, and the vertical supply tube has a recovery path disposed in a rear end portion of the vertical supply tube, extending downward from the reservoir cylinder, and having a lower end portion closed from below, a communication path extending in a circumferential direction of the vertical supply tube from the recovery path, and a communication opening disposed in front of the recovery path and configured to allow the communication path and the inside of the container body to communicate with each other.

According to the trigger-type liquid sprayer, a liquid inside the reservoir cylinder is recovered to the inside of the container body through the recovery path, the communication path, and the communication opening.

Here, the lower end portion of the recovery path is closed from below. Therefore, for instance, even if an impact force acts on the trigger-type liquid sprayer in the upward/downward direction and a high load is generated in the rear end portion of the vertical supply tube, breakage of the vertical supply tube starting from the lower end portion of the recovery path is unlikely to occur. Accordingly, the impact resistance of the trigger-type liquid sprayer can be improved.

The communication opening may be disposed in a front end portion of the vertical supply tube.

In this case, the communication opening is disposed in the front end portion of the vertical supply tube. Therefore, when the aforementioned impact force acts, occurrence of breakage starting from the communication opening can be effectively curbed.

The trigger mechanism may include a main piston configured to move forward and rearward in response to movement of the trigger portion, and a main cylinder inside of which is compressed and decompressed in response to movement of the main piston, the inside of the main cylinder communicating with the inside of the vertical supply tube, a residual pressure release path extending downward from the main cylinder and opening inside the container body may be provided in the front end portion of the vertical supply tube, the communication path may be configured to allow the recovery path and the residual pressure release path to communicate with each other, and the communication opening may be formed by a lower end portion of the residual pressure release path.

In this case, the communication opening is formed by the lower end portion of the residual pressure release path. Therefore, it is possible to use the residual pressure release path as the communication opening. Accordingly, the structure of the trigger-type liquid sprayer can be simplified, and the number of openings where breakage may start can be reduced.

The vertical supply tube may include an outer tube, and an inner tube fitted into the outer tube, and the recovery path and the communication path may be provided between the outer tube and the inner tube.

In this case, the recovery path and the communication path are provided between the outer tube and the inner tube. Thus, the recovery path and the communication paths can be formed by forming grooves or the like on an outer circumferential surface of the outer tube or an inner circumferential surface of the inner tube, and the structure can be simplified.

The reservoir cylinder may be disposed above the vertical supply tube, intersect a center axis of the vertical supply tube, and protrude toward one side in the axial direction beyond the vertical supply tube, the vertical supply tube may include an outer tube formed integrally with the reservoir cylinder and an inner tube fitted into the outer tube, the inner tube may include a large diameter portion fitted into a mouth portion of the container body, a small diameter portion which is disposed inside the large diameter portion in a radial direction and into which a pipe for sucking up a liquid from the container body is fitted, and an annular connection portion connecting an inner circumferential surface of the large diameter portion and an outer circumferential surface of the small diameter portion to each other in the radial direction, an annular pipe fitting tube protruding downward from the annular connection portion may be formed in the small diameter portion, and a connection reinforcement portion integrally connecting the pipe fitting tube and the large diameter portion to each other in the radial direction may be formed at a rear part of the pipe fitting tube.

In this case, since the connection reinforcement portion integrally connecting the large diameter portion, which is fitted into the mouth portion of the container body, and the pipe fitting tube to each other in the radial direction is provided at the rear part of the pipe fitting tube, the strength of the rear part of the annular connection portion can be improved and the rigidity thereof can be enhanced. Accordingly, for example, even if an impact force due to a drop impact or contact with the outside acts on the reservoir cylinder and the vertical supply tube is displaced so as to warp or tilt, displacement such as warpage of the rear part of the annular connection portion can be curbed. Accordingly, occurrence of a flaw such as cracking in the connected portion or the like between the rear part of the annular connection portion and the pipe fitting tube can be curbed. In addition, since it can be expected that the rigidity of the pipe fitting tube be also improved by the connection reinforcement portion, occurrence of the foregoing flaw can be curbed.

Therefore, the rigidity against an unexpected external force can be enhanced, and the impact resistance of the trigger-type liquid sprayer can be improved. As a result, a high-quality trigger-type liquid sprayer having a high rigidity against a drop impact, a contact impact, or the like can be obtained. Moreover, since the impact resistance can be improved, a larger internal volume (internal capacity) inside the reservoir cylinder can be secured, for example, by forming the rear tube portion to extend rearward beyond the vertical supply tube. Accordingly, more liquid can be reserved inside the reservoir cylinder and a trigger-type liquid sprayer suitable for continuous injection can be obtained.

The connection reinforcement portion may be connected to the annular connection portion from below.

In this case, since the connection reinforcement portion is also formed integrally with the annular connection portion, the strength of the rear part of the annular connection portion can be further improved and the rigidity thereof can be enhanced. Accordingly, occurrence of a flaw such as cracking in the connected portion or the like between the rear part of the annular connection portion and the pipe fitting tube can be effectively curbed.

The connection reinforcement portion may be formed between the pipe fitting tube and the large diameter portion and extend in the circumferential direction.

In this case, utilizing the connection reinforcement portion extending in the circumferential direction, the rear part of the pipe fitting tube and the large diameter portion can be integrally connected to each other over a wider range, and therefore the rigidity of the rear part of the annular connection portion can be further enhanced. Therefore, occurrence of a flaw such as cracking in the connected portion or the like between the rear part of the annular connection portion and the pipe fitting tube can be more effectively curbed.

Advantageous Effects of Invention

According to the trigger-type liquid sprayer of the present invention, the impact resistance can be improved.

DESCRIPTION OF EMBODIMENTS

First Embodiment

Hereinafter, a first embodiment according to the present invention will be described with reference to FIGS. 1 to 5.

In the present embodiment, a spray container in which a trigger-type liquid sprayer 1 is attached to a container body A will be described as an example.

Figure 1:
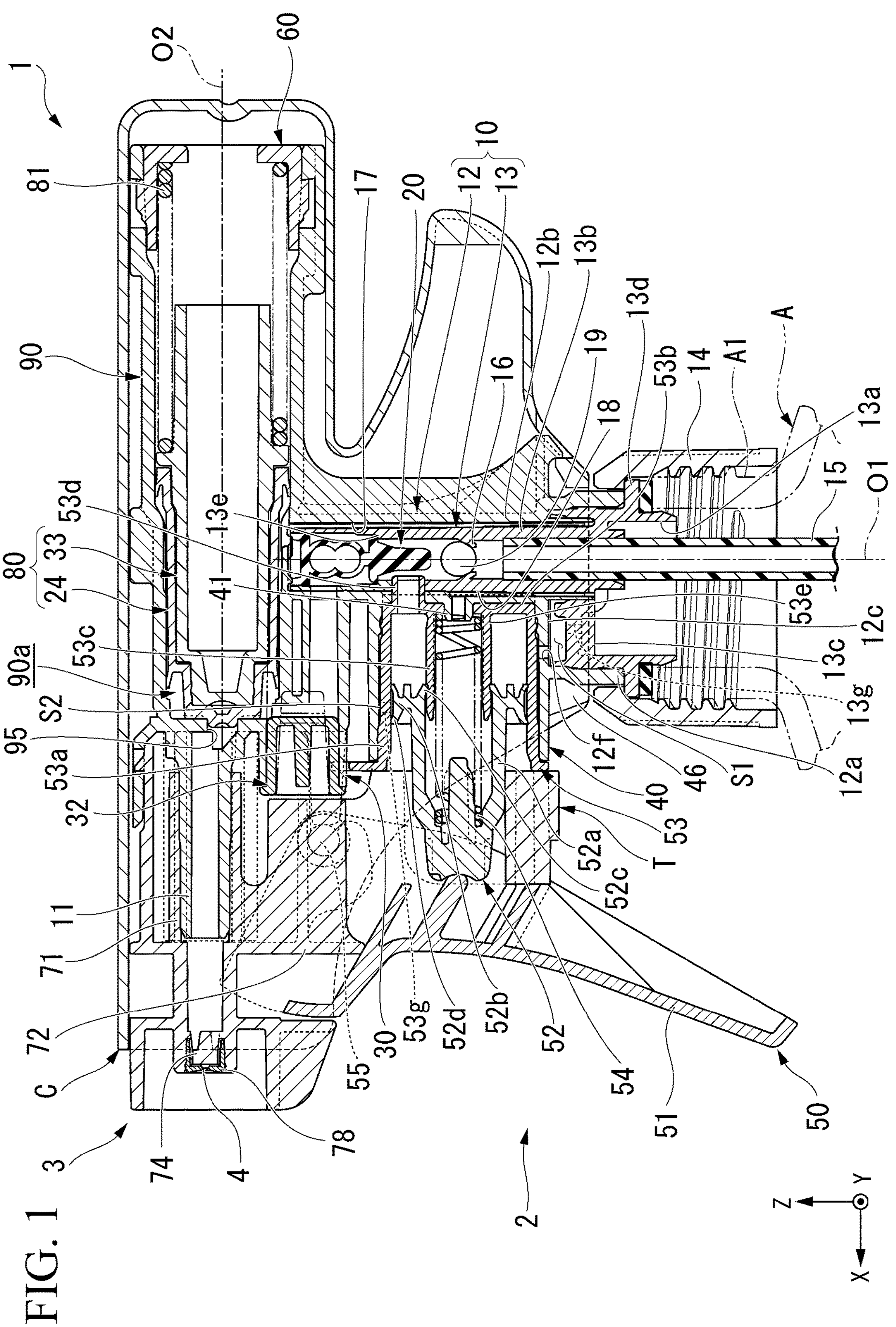
FIG. 1 is a longitudinal cross-sectional view illustrating a first embodiment of a trigger-type liquid sprayer according to the present invention.

As illustrated in FIG. 1, the trigger-type liquid sprayer 1 of the present embodiment includes a sprayer main body 2 which is mounted on the container body A accommodating a liquid therein, and a nozzle member 3 having a spray hole 4 for spraying a liquid and mounted on the sprayer main body 2.

Unless otherwise specified, each constituent component of the trigger-type liquid sprayer 1 is a molded article using a synthetic resin.

The sprayer main body 2 includes a vertical supply tube 10, a mounting cap 14, an injection tube portion 11, a trigger mechanism 50, a reservoir cylinder 90, a support member 60, a reservoir plunger 80, a bias member 81, a reservoir valve 20, and a cover body C.

In the present embodiment, a center axis of the vertical supply tube 10 will be referred to as an axis O1. A direction (Z axis direction) along the axis O1 will be referred to as an upward/downward direction, and in the upward/downward direction, a side (negative Z side) of the container body A will be referred to as a lower side or downward and a side (positive Z side) opposite thereto will be referred to as an upper side or upward. When viewed in the upward/downward direction, one direction (X axis direction) intersecting the axis O1 will be referred to as a forward/rearward direction, and a direction (Y axis direction) orthogonal to both of the upward/downward direction and the forward/rearward direction will be referred to as a leftward/rightward direction. In the forward/rearward direction, a side (positive X side) where the spray hole 4 formed in the nozzle member 3 opens will be referred to as a front side or forward, and a side (negative X side) opposite thereto will be referred to as a rear side or rearward.

In addition, in the present embodiment, a center axis of the reservoir cylinder 90 will be referred to as an axis O2. In the present embodiment, the axis O2 extends in the forward/rearward direction. That is, in the present embodiment, the forward/rearward direction corresponds to an axial direction along the center axis of the reservoir cylinder 90. In the present embodiment, the rear side (negative X side) corresponds to one side in the axial direction along the center axis of the reservoir cylinder 90. In the present embodiment, the front side (positive X side) corresponds to the other side in the axial direction along the center axis of the reservoir cylinder 90. However, the axial direction along the axis O2 may not coincide with the forward/rearward direction.

The vertical supply tube 10 extends in the upward/downward direction and sucks up a liquid inside the container body A. The vertical supply tube 10 has an outer tube 12 having a topped cylindrical shape, and an inner tube 13 fitted into the outer tube 12. The axis O1 of the vertical supply tube 10 constituted of the outer tube 12 and the inner tube 13 is positioned behind a container axis of the container body A.

Figure 2:
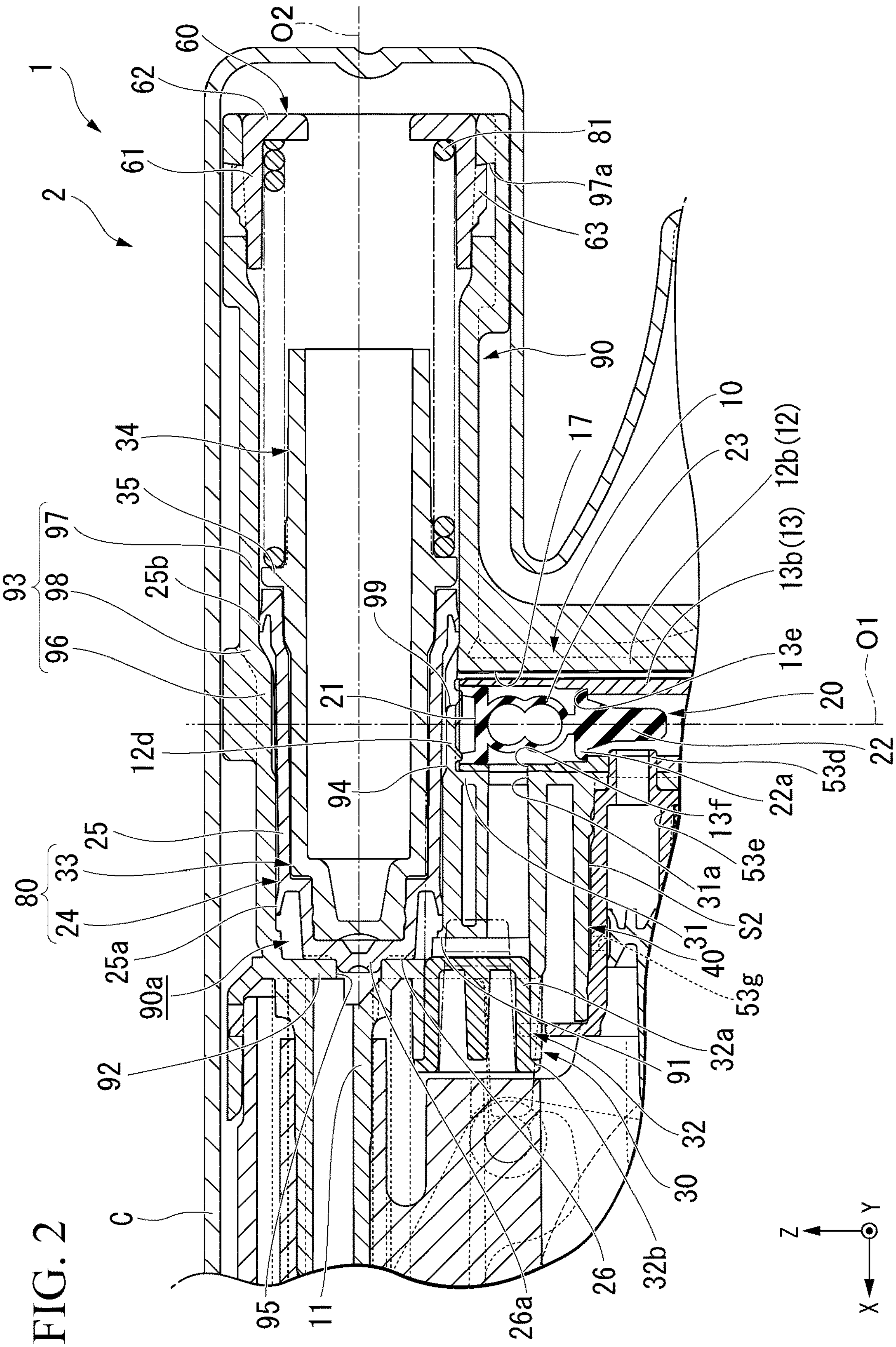
FIG. 2 is an enlarged longitudinal cross-sectional view of a periphery of a reservoir cylinder and a reservoir plunger illustrated in FIG. 1.

The outer tube 12 has a large diameter portion 12*a*, a small diameter portion 12*b* disposed above the large diameter portion 12*a* and having a diameter smaller than the large diameter portion 12*a*, and an annular connection portion 12*c* connecting an upper end portion of the large diameter portion 12*a* and a lower end portion of the small diameter portion 12*b* to each other. The upper end portion of the large diameter portion 12*a* has a diameter smaller than a part of the large diameter portion 12*a* positioned below the upper end portion. An outer circumferential surface of the upper end portion of the large diameter portion 12*a* is recessed throughout the entire circumference of the large diameter portion 12*a*. The outer circumferential surface of the upper end portion of the large diameter portion 12*a* is not provided with a projection rib or the like. The small diameter portion 12*b* has a topped cylindrical shape and is located coaxially with the axis O1. As illustrated in FIG. 2, a top wall portion 12*d* of the small diameter portion 12*b* is formed integrally with the reservoir cylinder 90.

As illustrated in FIG. 1, the inner tube 13 has a large diameter portion 13*a*, a small diameter portion 13*b* disposed above the large diameter portion 13*a* and having a diameter smaller than the large diameter portion 13*a*, and an annular connection portion 13*c* connecting an upper end portion of the large diameter portion 13*a* and a lower part of the small diameter portion 13*b* to each other.

The large diameter portion 13*a* is located inside the large diameter portion 12*a* of the outer tube 12. The upper end portion of the large diameter portion 13*a* is fitted into the upper end portion of the large diameter portion 12*a* of the outer tube 12. The upper end portion of the large diameter portion 13*a* comes into surface-contact with an inner circumferential surface of the large diameter portion 12*a* of the outer tube 12 throughout the entire circumference. A part between an outer circumferential surface of the upper end portion of the large diameter portion 13*a* and the inner circumferential surface of the upper end portion of the large diameter portion 12*a* of the outer tube 12 is sealed. A lower end portion of the large diameter portion 13*a* protrudes downward from the inside of the large diameter portion 12*a* of the outer tube 12. An annular rim portion 13*d* protruding outward in the radial direction of the large diameter portion 13*a* is formed on a part of the large diameter portion 13*a* protruding downward from the large diameter portion 12*a* of the outer tube 12. The rim portion 13*d* is located inside an upper end portion of the mounting cap 14 mounted (for example, screwed) on a mouth portion A1 of the container body A and interlocks the upper end portion of the mounting cap 14 so as to be rotatable around the axis thereof. The rim portion 13*d* is interposed between the upper end portion of the mounting cap 14 and an upper end opening edge of the mouth portion A1 of the container body A in the upward/downward direction.

The small diameter portion 13*b* has a cylindrical shape and is located coaxially with the axis O1. The small diameter portion 13*b* opens on both sides in the upward/downward direction. The small diameter portion 13*b* is located inside the small diameter portion 12*b* of the outer tube 12. An upper end opening edge of the small diameter portion 13*b* is slightly separated downward from the top wall portion 12*d* of the outer tube 12. An upper portion of a pipe 15 extending in the upward/downward direction is fitted into the lower part of the small diameter portion 13*b*. A lower opening section of the pipe 15 is positioned in a bottom portion (not illustrated) of the container body A.

A gap S1 in the upward/downward direction is provided between an upper surface of the annular connection portion 13*c* and a lower surface of the annular connection portion 12*c* of the outer tube 12.

A valve seat portion 13*e* is formed on the inner circumferential surface of the inner tube 13. In the illustrated example, the valve seat portion 13*e* is formed by a step obtained by making the inner diameter of a part of the inner tube 13 positioned above the valve seat portion 13*e* larger than the inner diameter of a part of the inner tube 13 positioned below the valve seat portion 13_e_. The reservoir valve 20 is seated on an upper surface of the valve seat portion 13_e_.

A support tube portion 16 having a cylindrical shape is provided on a part of the inner circumferential surface of the inner tube 13 positioned below the valve seat portion 13_e_ and above an upper end portion of the pipe 15. The outer diameter of the support tube portion 16 is smaller than the inner diameter of the inner tube 13. The support tube portion 16 is located coaxially with the axis O1 and protrudes upward from the inner circumferential surface of the inner tube 13. A ball valve 19 is disposed on an upper end opening edge of the support tube portion 16 so as to be separable upward from the upper end opening edge.

Figure 3:
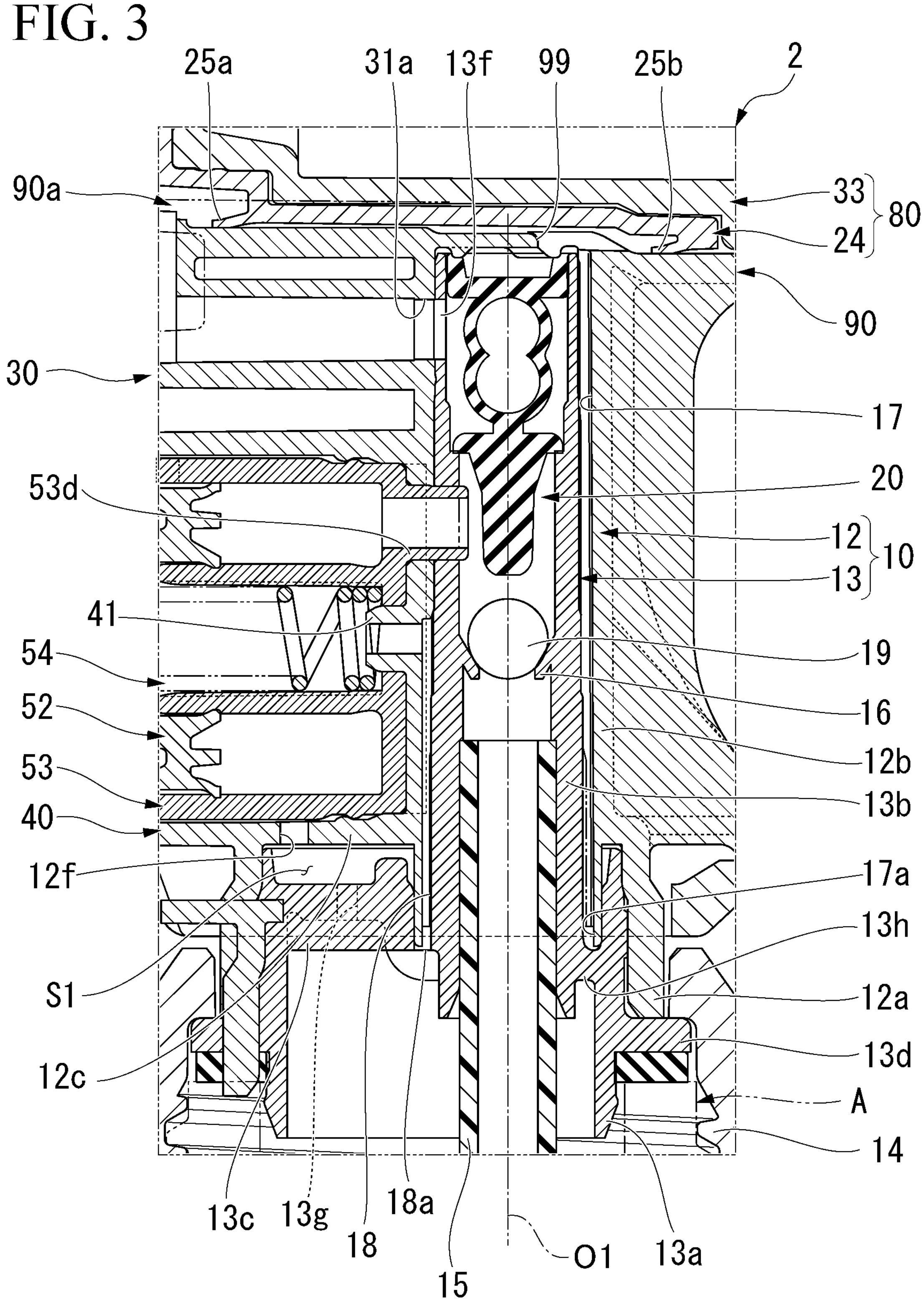
FIG. 3 is an enlarged longitudinal cross-sectional view of a periphery of a vertical supply tube illustrated in FIG. 1.
Figure 4:
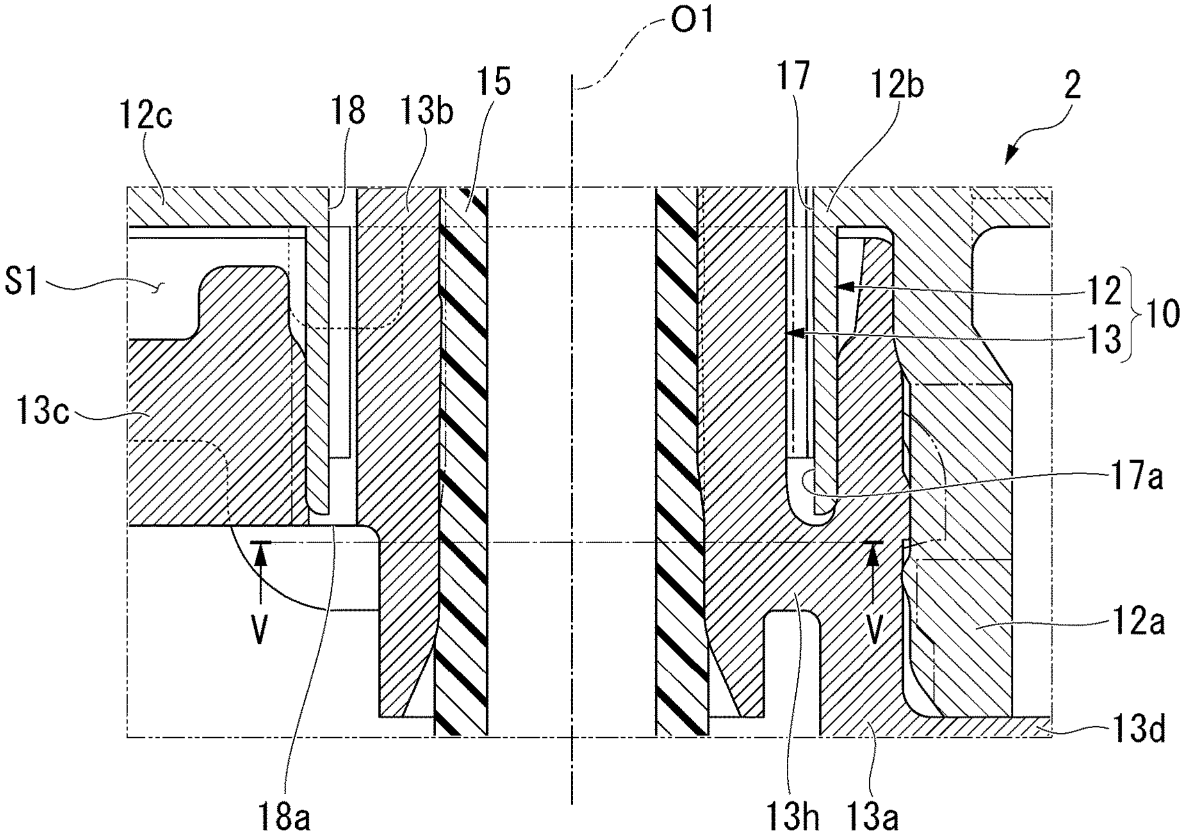
FIG. 4 is an enlarged view of a main part in FIG. 3.

As illustrated in FIGS. 3 and 4, a recovery path 17 is provided between the outer tube 12 and the inner tube 13. The recovery path 17 extends downward from the reservoir cylinder 90. An upper end portion of the recovery path 17 opens upward. A lower end portion of the recovery path 17 is closed from below by a closed portion 13_h_ of the inner tube 13. The recovery path 17 is a vertical groove formed on the inner circumferential surface of the small diameter portion 12_b_ of the outer tube 12 and extending in the upward/downward direction. The closed portion 13_h_ is a part of the inner tube 13 facing the vertical groove from below (in the illustrated example, the annular connection portion 13_c_).

The recovery path 17 is positioned behind the axis O1. The recovery path 17 is disposed in a rear end portion of the vertical supply tube 10. The recovery path 17 communicates with the inside of the container body A through communication paths 17_a_ and a communication opening 18_a_, which will be described below.

For example, the recovery path 17 may be a vertical groove formed on an outer circumferential surface of the inner tube 13. Moreover, the recovery path 17 may be formed by combining vertical grooves respectively formed in the outer tube 12 and the inner tube 13.

As illustrated in FIGS. 1 and 2, a connection tube portion 30 extending forward is provided in an upper end portion of the vertical supply tube 10. The connection tube portion 30 has a bottomed cylindrical shape opening forward and having a rear side closed. As illustrated in FIG. 2, a bottom portion 31 of the connection tube portion 30 is formed integrally with the upper end portion of the outer tube 12. A penetration hole 31_a_ penetrating the bottom portion 31 in the forward/rearward direction is formed in the bottom portion 31. The penetration hole 31_a_ opens toward a penetration hole 13_f_ formed in the upper end portion of the inner tube 13. The penetration hole 13_f_ is formed in a part of the small diameter portion 13_b_ positioned above the valve seat portion 13_e_ in the inner tube 13. Accordingly, the inside of the connection tube portion 30 communicates with the inside of a part of the inner tube 13 positioned above the valve seat portion 13_e_ through the penetration holes 31_a_ and 13_f_.

The inner diameter of the connection tube portion 30 is equal to or larger than the inner diameter of the inner tube 13. A closing plug 32 is tightly fitted into a front end portion of the connection tube portion 30.

The closing plug 32 includes a plug main body 32_a_ and a flange portion 32_b_.

The plug main body 32_a_ has a bottomed cylindrical shape opening forward and having a rear side closed. The plug main body 32_a_ is tightly fitted into the front end portion of the connection tube portion 30. Accordingly, the closing plug 32 closes a front opening section of the connection tube portion 30.

The flange portion 32_b_ projects outward from a front end opening edge of the plug main body 32_a_. The flange portion 32_b_ abuts a front end opening edge of the connection tube portion 30 from the front when the plug main body 32_a_ is mounted on the connection tube portion 30.

As illustrated in FIG. 1, a tube portion 40 for a cylinder is provided below the connection tube portion 30.

The tube portion 40 for a cylinder protrudes forward from the small diameter portion 12_b_ of the outer tube 12 and opens forward. A rear part of a lower end portion of the tube portion 40 for a cylinder is formed integrally with the annular connection portion 12_c_ of the outer tube 12.

Lower ribs 46 are provided around the tube portion 40 for a cylinder. The lower ribs 46 are laid across the tube portion 40 for a cylinder and the large diameter portion 12_a_. For example, the lower ribs 46 are provided at positions avoiding a part immediately below the tube portion 40 for a cylinder. A pair of lower ribs 46 are provided with an interval therebetween in a circumferential direction around an axis of the tube portion 40 for a cylinder. An upper end of each of the lower ribs 46 is connected to an outer circumferential surface of the tube portion 40 for a cylinder, and a rear end of each of the lower ribs 46 is connected to the outer circumferential surface of the large diameter portion 12_a_. The lower ribs 46 may be provided immediately below the tube portion 40 for a cylinder.

A fitting tube portion 41 protruding forward from the small diameter portion 12_b_ of the outer tube 12 and opening forward is provided inside the tube portion 40 for a cylinder. The fitting tube portion 41 is located coaxially with the tube portion 40 for a cylinder. A front end portion of the fitting tube portion 41 is positioned behind a front end portion of the tube portion 40 for a cylinder.

As illustrated in FIGS. 3 and 4, a residual pressure release path 18 is formed between the inner circumferential surface of the outer tube 12 and the outer circumferential surface of the inner tube 13. The residual pressure release path 18 extends downward from a cylinder 53, which will be described below. The residual pressure release path 18 extends in the upward/downward direction. The residual pressure release path 18 allows the inside of the fitting tube portion 41 and the inside of the large diameter portion 13_a_ of the inner tube 13 to communicate with each other. The residual pressure release path 18 allows the inside of the fitting tube portion 41 and the inside of the container body A to communicate with each other through the inside of the large diameter portion 13_a_.

The residual pressure release path 18 is separated from the recovery path 17 around the axis O1. The residual pressure release path 18 (the communication opening 18_a_, which will be described below) is positioned in front of the recovery path 17 and the axis O1. The residual pressure release path 18 is disposed in a front end portion of the vertical supply tube 10.

An upper end portion of the residual pressure release path 18 is positioned behind the fitting tube portion 41. A lower end portion of the residual pressure release path 18 opens downward. The lower end portion of the residual pressure release path 18 is the communication opening 18_a_ formed in the inner tube 13 (the annular connection portion 13_c_). The communication opening 18_a_ opens downward from the inner tube 13 and communicates with the inside of the container body A.

A part of the residual pressure release path 18 positioned above the lower end portion (the communication opening 18_a_) is a vertical groove formed on the inner circumferential surface of the small diameter portion 12_b_ of the outer tube 12 and extending in the upward/downward direction. For example, the residual pressure release path 18 may be formed by a vertical groove formed on the outer circumferential surface of the inner tube 13. Moreover, the residual pressure release path 18 may be formed by combining vertical grooves respectively formed in the outer tube 12 and the inner tube 13.

As illustrated in FIGS. 1 and 2, the injection tube portion 11 extends in the forward/rearward direction. The inside of the injection tube portion 11 communicates with the inside of the vertical supply tube 10. The injection tube portion 11 extends forward from the reservoir cylinder 90 and guides a liquid that has passed through the inside of the vertical supply tube 10 and the inside of the connection tube portion 30 to the spray hole 4. The center axis of the injection tube portion 11 is disposed parallel to the axis O2. In the illustrated example, the center axis of the injection tube portion 11 is positioned above the axis O2 of the reservoir cylinder 90.

The cover body C covers the entirety of the vertical supply tube 10 except for the lower end portion, the entirety of the injection tube portion 11, and the entirety of the reservoir cylinder 90 from at least both sides in the leftward/rightward direction and above.

The trigger mechanism 50 includes a trigger portion 51, the cylinder 53 (main cylinder), a piston 52 (main piston), and a coil spring 54.

The trigger portion 51 is disposed in front of the vertical supply tube 10 and configured to be movable rearward in a state in which the trigger portion 51 is biased forward. The trigger portion 51 is provided below the injection tube portion 11 and extends in the upward/downward direction. The trigger portion 51 is supported to be swingable in the forward/rearward direction about a rotary shaft portion 55 extending in the leftward/rightward direction. When viewed in the leftward/rightward direction, the rotary shaft portion 55 is provided in an intermediate part of the injection tube portion 11 in the forward/rearward direction and located adjacent to the lower side of the injection tube portion 11. The piston 52 is movable in the forward/rearward direction in response to a swing of trigger portion 51 in the forward/rearward direction. The trigger mechanism 50 is configured to cause a liquid to flow from the inside of the vertical supply tube 10 toward the spray hole 4 in response to a rearward swing of the trigger portion 51.

An upper end portion of the trigger portion 51 abuts a lower end edge of a restriction wall 72 (which will be described below) in the upward/downward direction due to a forward biasing force of the coil spring 54. Accordingly, the trigger portion 51 is positioned at the foremost swing position.

The cylinder 53 is disposed behind the trigger portion 51 and faces the trigger portion 51 in the forward/rearward direction.

The cylinder 53 has an outer tube portion 53*a* opening forward, a rear wall portion 53*b* closing a rear end opening of the outer tube portion 53*a*, a tubular piston guide 53*c* protruding forward from a center part of the rear wall portion 53*b*, and a tubular communication tube portion 53*d* protruding rearward from a part of the rear wall portion 53*b* positioned above the piston guide 53*c* and opening on both sides in the forward/rearward direction.

The outer tube portion 53*a* is disposed coaxially with the tube portion 40 for a cylinder. The outer tube portion 53*a* is fitted into the tube portion 40 for a cylinder. An inner circumferential surface of the tube portion 40 for a cylinder and an outer circumferential surface of the outer tube portion 53*a* are in tight-contact with each other in both end portions in the forward/rearward direction. An annular gap S2 is provided between the inner circumferential surface of the tube portion 40 for a cylinder and the outer circumferential surface of the outer tube portion 53*a*, the annular gap S2 being positioned in an intermediate portion between the above described both end portions in the forward/rearward direction.

A first vent hole 53*g* allowing the inside of the outer tube portion 53*a* and the gap S2 to communicate with each other is formed in the outer tube portion 53*a*. As illustrated in FIG. 1, a second vent hole 12*f* allowing the gap S2 and the gap S1 between the annular connection portion 12*c* of the outer tube 12 and the annular connection portion 13*c* of the inner tube 13 to communicate with each other is formed in the annular connection portion 12*c* of the outer tube 12. Moreover, a third vent hole 13*g* allowing the gap S1 and the inside of the mounting cap 14 to communicate with each other is formed in the annular connection portion 13*c* of the inner tube 13.

The communication tube portion 53*d* is fitted into the penetration holes formed in the outer tube 12 and the inner tube 13. The inside of the inner tube 13 of the vertical supply tube 10 and the inside of the cylinder 53 communicate with each other through the inside of the communication tube portion 53*d*. A rear end portion of the communication tube portion 53*d* protrudes into the inner tube 13. The penetration hole of the inner tube 13 into which the communication tube portion 53*d* is fitted opens in a part of the small diameter portion 13*b* of the inner tube 13 positioned between the valve seat portion 13*e* and the support tube portion 16. Therefore, the ball valve 19 separably seated on the upper end opening edge of the support tube portion 16 can switch to bring the inside of the container body A and the inside of the cylinder 53 in communication with each other and block the communication.

The ball valve 19 is a check valve blocking communication between the inside of the container body A and the inside of the cylinder 53 through the inside of the vertical supply tube 10 when the inside of the cylinder 53 is compressed, and allowing communication between the inside of the container body A and the inside of the cylinder 53 through the inside of the vertical supply tube 10 by being displaced upward when the inside of the cylinder 53 is decompressed. Since the reservoir valve 20 is disposed above the ball valve 19, excessive upward displacement of the ball valve 19 is restricted by the reservoir valve 20. Excessive upward displacement of the ball valve 19 may be restricted by the rear end portion of the communication tube portion 53*d*.

The piston guide 53*c* has a bottomed cylindrical shape opening forward and having a rear side closed. The piston guide 53*c* is disposed inside the outer tube portion 53*a*. A front end portion of the piston guide 53*c* is positioned behind a front end portion of the outer tube portion 53*a*. A bottom portion of the piston guide 53*c* has an annular shape, and the fitting tube portion 41 is fitted into the bottom portion. The front end portion of the fitting tube portion 41 protrudes into the piston guide 53*c*. The piston guide 53*c* is located coaxially with the fitting tube portion 41. An annular recessed portion 53*e* is formed on an outer circumferential surface of the rear end portion of the piston guide 53*c*.

The piston 52 is disposed inside the cylinder 53 and configured to be movable in the forward/rearward direction. The piston 52 is moved in the forward/rearward direction in association with a swing of the trigger portion 51. The inside of the cylinder 53 is compressed and decompressed in response to movement of the piston 52 in the forward/rearward direction. The piston 52 is located coaxially with the cylinder 53, and has a topped cylindrical shape opening rearward and having a front side closed. The piston 52 is biased forward together with the trigger portion 51 due to a biasing force of the coil spring 54. The piston 52 moves rearward in response to a rearward swing of the trigger portion 51 and is thrust into the cylinder 53.

The piston 52 has a piston main body portion 52*a* which opens rearward and into which the piston guide 53*c* is inserted, and a sliding tube portion 52*b* which protrudes outward in the radial direction of the piston main body portion 52*a* from a rear end portion of the piston main body portion 52*a* and comes into sliding-contact with an inner circumferential surface of the outer tube portion 53*a*.

The piston main body portion 52*a* has a topped cylindrical shape opening rearward and having a front side closed. The inner diameter of the piston main body portion 52*a* is slightly larger than the outer diameter of the piston guide 53*c*. A front end portion of the piston main body portion 52*a* abuts the trigger portion 51 from behind.

An annular inner lip portion 52*c* protruding inward in the radial direction of the piston main body portion 52*a* and coming into sliding-contact with an outer circumferential surface of the piston guide 53*c* is formed in the rear end portion of the piston main body portion 52*a*. Accordingly, sealability is secured between the inner lip portion 52*c* and the outer circumferential surface of the piston guide 53*c*.

Here, when the piston 52 moves rearward and the inner lip portion 52*c* reaches the recessed portion 53*e* of the piston guide 53*c*, a slight gap is formed between the inner lip portion 52*c* and the recessed portion 53*e*. Through this gap, the inside of the outer tube portion 53*a* of the cylinder 53 communicates with a gap between an inner circumferential surface of the piston main body portion 52*a* and the outer circumferential surface of the piston guide 53*c*. Accordingly, the inside of the outer tube portion 53*a* communicates with the inside of the fitting tube portion 41 through the inside of the piston guide 53*c*. The inner lip portion 52*c* reaches the recessed portion 53*e* when the piston 52 is positioned at the rearmost position.

The sliding tube portion 52*b* has a diameter that is increased forward and rearward from a central portion in the forward/rearward direction. The sliding tube portion 52*b* has outer lip portions 52*d* positioned in both end portions thereof in the forward/rearward direction. The outer lip portions 52*d* come into tight sliding-contact with the inner circumferential surface of the outer tube portion 53*a*. Accordingly, sealability is secured between the outer lip portions 52*d* and the inner circumferential surface of the outer tube portion 53*a*.

When the trigger portion 51 is at the foremost swing position, the piston 52 is positioned at the foremost position corresponding thereto. At this time, the sliding tube portion 52*b* closes the first vent hole 53*g* formed in the outer tube portion 53*a*. Further, when the piston 52 moves rearward from the foremost position by a predetermined amount in response to a rearward swing of the trigger portion 51, the sliding tube portion 52*b* opens the first vent hole 53*g*, and the first vent hole 53*g* is opened to the outside of the trigger-type liquid sprayer 1 through the inside of the outer tube portion 53*a*. Accordingly, the inside of the container body A communicates with the outside of the trigger-type liquid sprayer 1 through the third vent hole 13*g* formed in the annular connection portion 13*c* of the inner tube 13, the gap S1, the second vent hole 12*f*, the gap S2, and the first vent hole 53*g*.

For example, the coil spring 54 is formed of a metal material or the like and is located coaxially with the piston 52 and the cylinder 53. The coil spring 54 is disposed to straddle the inside of the piston guide 53*c* and the inside of the piston main body portion 52*a*. A rear end portion of the coil spring 54 is supported by the bottom portion (the rear wall portion 53*b*) of the piston guide 53*c*. The rear end portion of the coil spring 54 surrounds the front end portion of the fitting tube portion 41. A front end portion of the coil spring 54 is supported by a stepped surface which is formed inside the piston main body portion 52*a* and faces the rear side. The coil spring 54 biases the trigger portion 51 forward via the piston 52.

A stopper T is provided in a gap in the forward/rearward direction between the trigger portion 51 and the cylinder 53 in an attachable/detachable manner. The stopper T restricts a rearward swing of the trigger portion 51 by abutting the trigger portion 51 and the cylinder 53. A user may discard the detached stopper T or may reattach the stopper T after using the trigger-type liquid sprayer 1 to restrict a rearward swing of the trigger portion 51

The reservoir cylinder 90 is disposed above the vertical supply tube 10 and the connection tube portion 30. A liquid that has passed through the inside of the vertical supply tube 10 and the inside of the connection tube portion 30 is supplied to the inside of the reservoir cylinder 90 in response to a rearward swing of the trigger portion 51. The reservoir cylinder 90 extends in the forward/rearward direction and straddles the vertical supply tube 10 in the forward/rearward direction. The reservoir cylinder 90 is disposed substantially parallel to the connection tube portion 30 and the tube portion 40 for a cylinder. A lower end portion of the reservoir cylinder 90 is formed integrally with the upper end portion of the vertical supply tube 10 and an upper end portion of the connection tube portion 30.

As illustrated in FIG. 2, the reservoir cylinder 90 includes a front wall portion 92 positioned at the front end and a cylinder tube 93 extending rearward from the front wall portion 92, and the entirety of the reservoir cylinder 90 has a topped cylindrical shape opening rearward and having a front side closed.

The front wall portion 92 protrudes upward from an intermediate part of the connection tube portion 30 in the forward/rearward direction. A communication hole 95 penetrating the front wall portion 92 in the forward/rearward direction is formed in the front wall portion 92. The communication hole 95 has a circular shape and is located coaxially with the axis O2. The communication hole 95 opens in a storage space 90*a* (which will be described below) inside the reservoir cylinder 90 and in the injection tube portion 11 communicating with the spray hole 4.

The communication hole 95 may be formed in the cylinder tube 93.

The cylinder tube 93 has a front tube portion 96 extending rearward from the front wall portion 92, a rear tube portion 97 having an outer diameter and an inner diameter larger than those of the front tube portion 96 and positioned behind the front tube portion 96, and a stepped portion 98 connecting the front tube portion 96 and the rear tube portion 97 to each other in the forward/rearward direction. The stepped portion 98 has a diameter that is increased rearward from the front. The top wall portion 12*d* of the outer tube 12 is connected to a connected portion between the front tube portion 96 and the stepped portion 98. The rear tube portion 97 is positioned behind the vertical supply tube 10.

A supply hole 91, communication grooves 94, and a recovery hole 99 are formed in the reservoir cylinder 90.

The supply hole 91 opens in a part of the connection tube portion 30 positioned behind the plug main body 32*a*. The supply hole 91 is formed at a lower part of the front end portion in the front tube portion 96. A liquid that has passed through the inside of the vertical supply tube 10 and the inside of the reservoir cylinder 90 is supplied to the inside of the connection tube portion 30 through the supply hole 91.

The communication grooves 94 are formed on an inner circumferential surface in a rear portion of the front tube portion 96. A plurality of communication grooves 94 are disposed with an interval therebetween around the axis O2.

The recovery hole 99 penetrates the connected portion between the front tube portion 96 and the stepped portion 98 and the top wall portion 12*d* of the outer tube 12, which are integrally formed, in the upward/downward direction. The recovery hole 99 opens toward the upper end portion of the recovery path 17 provided in the vertical supply tube 10. The recovery hole 99 communicates with the inside of the container body A through the recovery path 17. A rear end portion of the communication groove 94 of the plurality of communication grooves 94 positioned on the lower side opens in a front end portion of the recovery hole 99.

The support member 60 is fixed to a rear end portion of the reservoir cylinder 90. The support member 60 has a support wall portion 62 positioned at the rear end and a fixed tube portion 61 extending forward from the support wall portion 62, and the entirety of the support member 60 has a bottomed cylindrical shape opening forward and having a rear side closed. The support member 60 is located coaxially with the axis O2. The fixed tube portion 61 is fitted into the rear end portion of the reservoir cylinder 90 in a state in which rearward movement and rotative movement around the axis O2 are restricted. The support wall portion 62 has an annular shape. The inside of a part of the reservoir cylinder 90 positioned behind the reservoir plunger 80 communicates with the outside through the inside of the support wall portion 62. Interlock protrusions 63 protruding outward in the radial direction are formed in the fixed tube portion 61. The plurality of interlock protrusions 63 are provided with an interval therebetween around the axis O2. The interlock protrusions 63 are interlocked with the inside of interlock recesses 97*a* formed in the rear tube portion 97.

The reservoir plunger 80 is disposed inside the reservoir cylinder 90 and configured to be movable in the forward/rearward direction along the axis O2. The reservoir plunger 80 moves rearward in response to supply of a liquid to the inside of the reservoir cylinder 90. The reservoir plunger 80 blocks communication between the inside of the vertical supply tube 10 and the spray hole 4 through the communication hole 95, and when the reservoir plunger 80 moves rearward, the reservoir plunger 80 allows the inside of the vertical supply tube 10 and the spray hole 4 to communicate with each other through the communication hole 95.

The reservoir plunger 80 has a slide member 24 sliding inside the reservoir cylinder 90 in the forward/rearward direction, and a reception member 33 fitted into the slide member 24. The slide member 24 and the reception member 33 have a tubular shape extending in the forward/rearward direction and are located coaxially with the axis O2.

For example, the slide member 24 is formed of a material softer than those of the reception member 33 and the reservoir cylinder 90, and has a plunger tube 25 extending in the forward/rearward direction and a closing wall 26 closing a front end opening of the plunger tube 25.

A front lip portion 25*a* and a rear lip portion 25*b* are formed on an outer circumferential surface of the plunger tube 25 throughout the whole circumference.

The front lip portion 25*a* closely slides on an inner circumferential surface of the front tube portion 96 in the cylinder tube 93 in the forward/rearward direction. Accordingly, sealability is secured between the front lip portion 25*a* and the inner circumferential surface of the front tube portion 96. The front lip portion 25*a* has a cylindrical shape protruding forward from the outer circumferential surface of the plunger tube 25. A gap is provided between an inner circumferential surface of the front lip portion 25*a* and an outer circumferential surface of the front end portion of the plunger tube 25. The front end portion of the plunger tube 25 positioned in front of the front lip portion 25*a* has a diameter smaller than a part of the plunger tube 25 positioned behind the front end portion. A gap is provided between the outer circumferential surface of the front end portion of the plunger tube 25 and an inner circumferential surface of the reservoir cylinder 90. The inside of the front lip portion 25*a* and the supply hole 91 formed in the reservoir cylinder 90 open in this gap.

This gap is the storage space 90*a* storing a liquid that has passed through the inside of the vertical supply tube 10 and expanding when the reservoir plunger 80 moves rearward in response to supply of the liquid.

The rear lip portion 25*b* closely slides on an inner circumferential surface of the rear tube portion 97 of the cylinder tube 93 in the forward/rearward direction. Accordingly, sealability is secured between the rear lip portion 25*b* and the inner circumferential surface of the rear tube portion 97. The rear lip portion 25*b* has a cylindrical shape protruding forward from an outer circumferential edge of a rear end of the plunger tube 25. A gap is provided between an inner circumferential surface of the rear lip portion 25*b* and the outer circumferential surface of the rear end portion of the plunger tube 25.

The closing wall 26 is pressed against a rear surface of the front wall portion 92 of the reservoir cylinder 90, more specifically, against a part of the rear surface positioned around an opening circumferential edge portion of the communication hole 95. A protrusion portion 26*a* protruding forward is formed on a front surface of the closing wall 26. The protrusion portion 26*a* has a truncated cone shape located coaxially with the axis O2. The protrusion portion 26*a* has an outer diameter that is decreased forward from the rear. The communication hole 95 is closed when an outer circumferential surface of the protrusion portion 26*a* abuts an inner surface of a rear end portion of the communication hole 95.

The reception member 33 has a reception tube 34 and a reception seat portion 35.

The reception tube 34 has a topped cylindrical shape opening rearward and having a front side closed and is disposed inside the plunger tube 25. A rear part of the reception tube 34 protrudes rearward from a rear opening section of the plunger tube 25 and is disposed inside the rear tube portion 97 of the cylinder tube 93. The outer diameter of the reception tube 34 is smaller than the inner diameter of the rear tube portion 97. An annular gap is provided between an outer circumferential surface of the rear part of the reception tube 34 and the inner circumferential surface of the rear tube portion 97. The front part of the bias member 81 is inserted into this gap.

The reception seat portion 35 has a flange shape protruding from the outer circumferential surface of the reception tube 34. The reception seat portion 35 is provided on the outer circumferential surface of the rear part of the reception tube 34. A front surface of the reception seat portion 35 abuts or approaches the rear end opening edge of the plunger tube 25.

The bias member 81 biases the reservoir plunger 80 forward. A front part of the bias member 81 surrounds the rear part of the reception tube 34. The bias member 81 is disposed between the reception seat portion 35 and the support wall portion 62 of the support member 60 in a state of being compressed in the forward/rearward direction. A front end edge of the bias member 81 abuts a rear surface of the reception seat portion 35. A rear end edge of the bias member 81 abuts a front surface of the support wall portion 62.

The bias member 81 is a metal coil spring located coaxially with the axis O2. A resin spring may be used or other members having elasticity may be used as the bias member 81.

When the reservoir plunger 80 moves rearward against the bias member 81 and the closing wall 26 is separated rearward from the front wall portion 92 of the reservoir cylinder 90, the communication hole 95 is opened. A liquid in the storage space 90*a* of the reservoir cylinder 90 is compressed until the reservoir plunger 80 moves rearward, and when the liquid pressure in the storage space 90*a* reaches a predetermined value and the reservoir plunger 80 moves rearward against the bias member 81, the liquid in the storage space 90*a* is supplied to the spray hole 4 side through the communication hole 95. That is, the reservoir plunger 80 functions as an accumulator valve.

The reservoir valve 20 is a check valve allowing supply of a liquid to the inside of the reservoir cylinder 90 from the inside of the vertical supply tube 10 and restricting outflow of a liquid to the inside of the vertical supply tube 10 from the inside of the reservoir cylinder 90. The reservoir valve 20 is provided inside the inner tube 13 of the vertical supply tube 10. The reservoir valve 20 has a fixed portion 21 fixed inside the upper end portion of the inner tube 13, a valve main body portion 22 disposed on the upper surface of the valve seat portion 13*e*, and an elastic deformation portion 23 connecting the fixed portion 21 and the valve main body portion 22 to each other.

The fixed portion 21 has a disk shape and is tightly fitted into the upper end portion of the inner tube 13.

The valve main body portion 22 has a pillar shape extending in the upward/downward direction. A lower end surface of the valve main body portion 22 faces the ball valve 19 in the upward/downward direction. The valve main body portion 22 faces a rear end opening of the communication tube portion 53*d* in the forward/rearward direction. A flange-shaped valve plate portion 22*a* is formed on a part of an outer circumferential surface of the valve main body portion 22 positioned above the communication tube portion 53*d*, and disposed on the upper surface of the valve seat portion 13*e* so as to be separable upward from the upper surface.

The elastic deformation portion 23 is elastically deformable in the upward/downward direction. When the inside of the cylinder 53 is compressed, the elastic deformation portion 23 is compressively deformed upward due to upward displacement of the valve main body portion 22. Thus, the valve plate portion 22*a* is separated upward from the valve seat portion 13*e* so as to allow supply of a liquid into the reservoir cylinder 90 from the inside of the vertical supply tube 10.

As illustrated in FIG. 1, the nozzle member 3 has a mounting tube 71 extending in the forward/rearward direction, the restriction wall 72 protruding downward from the mounting tube 71, and a nozzle shaft portion 74 disposed inside a front end portion of the mounting tube 71.

A rear part of the mounting tube 71 is tightly externally fitted to the injection tube portion 11.

The restriction wall 72 protrudes downward from a connected portion between the front part and the rear part in the mounting tube 71. The upper end portion of the trigger portion 51 abuts the lower end edge of the restriction wall 72 in the upward/downward direction.

A center axis of the nozzle shaft portion 74 is positioned slightly above the axis O2 of the reservoir cylinder 90. The nozzle shaft portion 74 is located coaxially with the injection tube portion 11. A front end portion of the nozzle shaft portion 74 is positioned slightly behind the front end portion of the mounting tube 71. A nozzle cap 78, which opens forward and in which the spray hole 4 for spraying a liquid forward is formed, is mounted on the nozzle shaft portion 74. The spray hole 4 is located coaxially with the injection tube portion 11. A communication path (not illustrated) allowing the inside of a part of the mounting tube 71 positioned behind the nozzle shaft portion 74 and the spray hole 4 to communicate with each other is provided between an outer surface of the nozzle shaft portion 74 and an inner surface of the nozzle cap 78.

In the trigger-type liquid sprayer 1 of the present embodiment, a protruding amount of a front part (mainly, the injection tube portion 11, the nozzle member 3, and the like) positioned in front of the vertical supply tube 10 from the axis O1 and a protruding amount of a rear part (mainly, the reservoir plunger 80, the reservoir cylinder 90, and the like) positioned behind the vertical supply tube 10 from the axis O1 are set such that the center of gravity of the trigger-type liquid sprayer 1 in the forward/rearward direction is positioned on or in the vicinity of the axis O1. In the illustrated example, the protruding amount of the front part of the trigger-type liquid sprayer 1 (the length from the axis O1 to the front end of the nozzle member 3) is longer than the protruding amount of the rear part of the trigger-type liquid sprayer 1 (the length from the axis O1 to the rear end of the reservoir cylinder 90). In addition, in the trigger-type liquid sprayer 1 of the present embodiment, the front part positioned in front of the vertical supply tube 10 also protrudes forward from the axis of the mounting cap 14. In the illustrated example, in the trigger-type liquid sprayer 1, the forward protruding amount and the rearward protruding amount with respect to the axis of the mounting cap 14 are set to be the same as each other. For this reason, for example, when the axis of the container body A having a cylindrical shape is disposed coaxially with the axis of the mounting cap 14, the center of gravity of the spray container is positioned on or in the vicinity of the center of the spray container in the forward/rearward direction. In the trigger-type liquid sprayer 1, the protruding amounts of the front part and the rear part with respect to the axis O1, and the forward protruding amount and the rearward protruding amount with respect to the axis of the mounting cap 14 can be suitably changed as long as a weight balance of the spray container in the forward/rearward direction is achieved.

Figure 5:
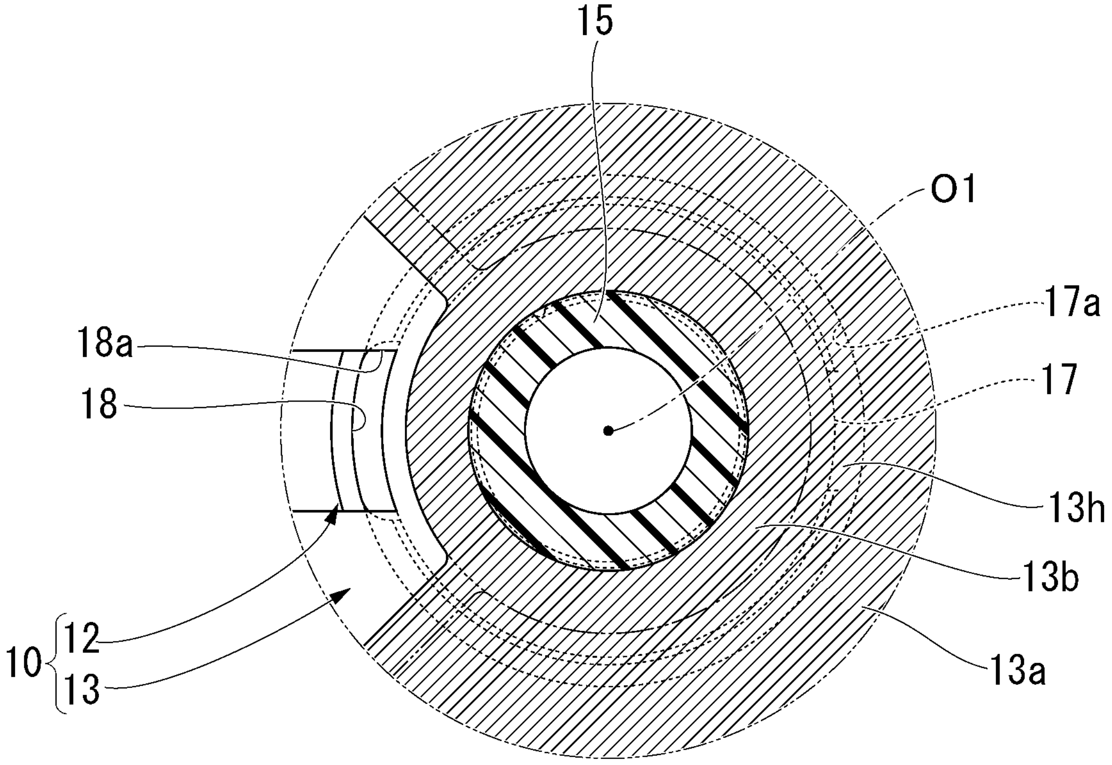
FIG. 5 is a cross-sectional view along arrow line V-V indicated in FIG. 4.

Here, as illustrated in FIGS. 4 and 5, in the present embodiment, the communication paths 17*a* are provided in the vertical supply tube 10. The communication paths 17*a* are provided between the outer tube 12 and the inner tube 13. The communication paths 17*a* allow the recovery path 17 and the residual pressure release path 18 to communicate with each other. The communication paths 17*a* extend in a circumferential direction of the vertical supply tube 10 from the recovery path 17. The communication paths 17*a* extend forward from the lower end portion of the recovery path 17 without positionally deviating in the upward/downward direction and are connected to the recovery path 17. Two communication paths 17*a* are provided with the axis O1 interposed therebetween in the radial direction. Each of the two communication paths 17*a* has a circular arc shape.

The communication paths 17*a* are circumferential grooves formed on the inner circumferential surface of the small diameter portion 12*b* of the outer tube 12 and extending in the circumferential direction. For example, the communication paths 17*a* may be circumferential grooves formed on the inner circumferential surface of the inner tube 13. Moreover, the communication paths 17*a* may be formed by combining circumferential grooves respectively formed in the outer tube 12 and the inner tube 13.

The communication paths 17*a* communicate with the inside of the container body A through the communication opening 18*a*. The communication paths 17*a* do not open downward (toward the inside of the container body A) at a part other than the communication opening 18*a* in the inner tube 13.

Next, a case of using the trigger-type liquid sprayer 1 constituted as described above will be described.

When the trigger portion 51 is first operated from an unused state, as the trigger portion 51 is pulled rearward against a biasing force of the coil spring 54, the piston 52 moves rearward from the foremost position. At this time, some of the air in the cylinder 53 is discharged into the container body A through the residual pressure release path 18.

Thereafter, when the trigger portion 51 is released, as the piston 52 is moved back forward inside the cylinder 53 due to a biasing force of the coil spring 54, the trigger portion 51 is also moved back forward in conjunction with the movement of the piston 52. For this reason, the inside of the cylinder 53 is decompressed such that the pressure in the cylinder 53 becomes lower than the pressure in the container body A, and thus the ball valve 19 is separated upward from the upper end opening edge of the support tube portion 16 in a state in which the valve body portion 22 of the reservoir valve 20 remains being pressed against the upper surface of the valve seat portion 13*e*. Accordingly, a liquid inside the container body A is sucked up into the vertical supply tube 10 and is introduced into the cylinder 53 through the inside of the support tube portion 16 and the inside of the communication tube portion 53*d*.

Since the residual pressure release path 18 is provided in this manner, a liquid sucked up from the inside of the container body A can be stored in the cylinder 53 while efficiently discharging the air in the cylinder 53, and preparation before use can be promptly completed with a smaller number of times of priming.

Hereinafter, it is assumed that the respective parts of the trigger-type liquid sprayer 1 are filled with a liquid by the above described operations of the trigger portion 51, and the liquid can be sucked up into the vertical supply pipe 10.

First, when the trigger portion 51 is pulled rearward against a biasing force of the coil spring 54, the piston 52 moves rearward from the foremost position, and the inside of the cylinder 53 is compressed. Accordingly, a liquid inside the cylinder 53 is supplied to the inside of the inner tube 13 of the vertical supply tube 10 through the inside of the communication tube portion 53*d*. Then, the liquid supplied to the inner tube 13 presses down the ball valve 19 disposed at the upper end opening edge of the support tube portion 16 and pushes up the valve main body portion 22 of the reservoir valve 20 such that the valve plate portion 22*a* is separated from the upper surface of the valve seat portion 13*e*.

Accordingly, a liquid inside the vertical supply tube 10 is supplied to the storage space 90*a* of the reservoir cylinder 90 through the penetration holes 13*f* and 31*a*, the inside of the connection tube portion 30, and the supply hole 91 illustrated in FIG. 2 so that the storage space 90*a* is compressed. The reservoir plunger 80 is moved rearward from the forefront position against a biasing force of the bias member 81 in response to compression of the storage space 90*a*, and the liquid is stored in the storage space 90*a*. In an initial stage in which a liquid begins to be introduced into the storage space 90*a*, the liquid enters a gap between the inner circumferential surface of the front lip portion 25*a* and the outer circumferential surface of the front end portion of the plunger tube 25. For this reason, it is easy to move the reservoir plunger 80 rearward.

When the reservoir plunger 80 moves rearward, the closing wall 26 is separated rearward from the front wall portion 92 of the reservoir cylinder 90, and the communication hole 95 is opened. Therefore, a high-pressure liquid in the storage space 90*a* can be guided to the spray hole 4 through the communication hole 95 and the inside of the injection tube portion 11, and the liquid can be sprayed forward through the spray hole 4.

In this manner, every time an operation of pulling the trigger portion 51 rearward is performed, a liquid can be sprayed through the spray hole 4, and a liquid can be stored in the storage space 90*a* by moving the reservoir plunger 80 rearward.

After that, when the trigger portion 51 is released, as the piston 52 is moved back forward inside the cylinder 53 due to a biasing force of the coil spring 54, the trigger portion 51 is also moved back forward in conjunction with the movement of the piston 52. For this reason, the inside of the cylinder 53 is decompressed such that the pressure in the cylinder becomes lower than the pressure in the container body A, and thus the ball valve 19 is separated upward from the upper end opening edge of the support tube portion 16 in a state in which the valve main body portion 22 of the reservoir valve 20 remains being pressed against the upper surface of the valve seat portion 13*e*. Accordingly, a liquid inside the container body A is sucked up into the vertical supply tube 10 and is introduced into the cylinder 53 through the inside of the support tube portion 16 and the inside of the communication tube portion 53*d*.

If a rearward traction operation of the trigger portion 51 is stopped, although supply of a liquid to the storage space 90*a* through the inside of the vertical supply tube 10 and the inside of the connection tube portion 30 stops, the reservoir plunger 80 begins to move forward toward the forefront position due to a biasing force of the bias member 81. At this time, outflow of a liquid from the storage space 90*a* to the inside of the vertical supply tube 10 is restricted by the reservoir valve 20.

Accordingly, a liquid accumulated in the storage space 90*a* can be guided to the spray hole 4 through the communication hole 95 and the inside of the injection tube portion 11, and the liquid can be continuously sprayed forward through the spray hole 4.

In this manner, not only when an operation of pulling the trigger portion 51 rearward is performed but also when an operation of the trigger portion 51 is not performed, a liquid can be sprayed, and continuous spraying of a liquid can be performed.

For instance, when an operation of pulling the trigger portion 51 rearward is performed in a state in which the reservoir plunger 80 is positioned at the rearmost position, there is a possibility that a liquid may be excessively supplied to the storage space 90*a* and liquid leakage, breakage of each portion, or the like may occur.

However, in the present embodiment, when the reservoir plunger 80 moves rearward to a certain extent, the front lip portion 25*a* reaches the communication grooves 94 so that the storage space 90*a* communicates with the inside of the container body A through the communication grooves 94, the recovery hole 99, the recovery path 17, the communication paths 17*a*, and the communication opening 18*a* (the residual pressure release path 18). That is, when the reservoir plunger 80 moves rearward, the recovery path 17 allows the storage space 90*a* and the inside of the container body A to communicate with each other. Therefore, a part of a liquid in the storage space 90*a* can be returned to the inside of the container body A and excessive supply of a liquid to the storage space 90*a* can be curbed. Accordingly, excessive increase in pressure in the storage space 90*a* can be curbed, and occurrence of liquid leakage or breakage of each portion can be curbed.

As described above, according to the trigger-type liquid sprayer 1 of the present embodiment, the lower end portion of the recovery path 17 is closed from below. Therefore, for instance, even if an impact force acts on the trigger-type liquid sprayer 1 in the upward/downward direction and a high load is generated in the rear end portion of the vertical supply tube 10, breakage of the vertical supply tube 10 starting from the lower end portion of the recovery path 17 is unlikely to occur. Accordingly, the impact resistance of the trigger-type liquid sprayer 1 can be improved.

The communication opening 18*a* is disposed in the front end portion of the vertical supply tube 10. Therefore, when the aforementioned impact force acts, occurrence of breakage starting from the communication opening 18*a* can be effectively curbed. In the present embodiment, the connection tube portion 30 and the tube portion 40 for a cylinder are provided at the front end portion of the vertical supply tube 10, and the front end portion of the vertical supply tube 10 is reinforced by the connection tube portion 30 and the tube portion 40 for a cylinder. For this reason, even when the aforementioned impact force acts, deformation of the front end portion of the vertical supply tube 10 in the upward/downward direction is curbed, and a load generated in the front end portion of the vertical supply tube 10 is restrained.

In addition, in the present embodiment, the communication opening 18*a* is disposed in the front end portion of the annular connection portion 13*c* of the inner tube 13, that is, in a part positioned in front of the small diameter portion 13*b*. Here, the small diameter portion 13*b* is eccentric rearward with respect to the large diameter portion 13*a*. For this reason, in a plan view, the front end portion of the annular connection portion 13*c* is larger than the rear end portion of the annular connection portion 13*c*. Therefore, as in the present embodiment, when the communication opening 18*a* is formed in the front end portion of the annular connection portion 13*c*, compared to when the communication opening 18*a* is formed in the rear end portion of the annular connection portion 13*c*, the strength of the annular connection portion 13*c* is relatively unlikely to be reduced. Accordingly, occurrence of breakage starting from the communication opening 18*a* as described above can be more effectively curbed.

The communication opening 18*a* is formed by the lower end portion of the residual pressure release path 18. Therefore, it is possible to use the residual pressure release path 18 as the communication opening 18*a*. Accordingly, the structure of the trigger-type liquid sprayer 1 can be simplified, and the number of openings where breakage may start can be reduced.

The recovery path 17 and the communication paths 17*a* are provided between the outer tube 12 and the inner tube 13. Thus, the recovery path 17 and the communication paths 17*a* can be formed by forming grooves or the like on the outer circumferential surface of the outer tube 12 or the inner circumferential surface of the inner tube 13, and the structure can be simplified.

Second Embodiment

Hereinafter, a second embodiment of a trigger-type liquid sprayer according to the present invention will be described with reference to FIGS. 6 to 12. In the present embodiment, a spray container in which a trigger-type liquid sprayer is attached to a container body will be described as an example.

Figure 6:
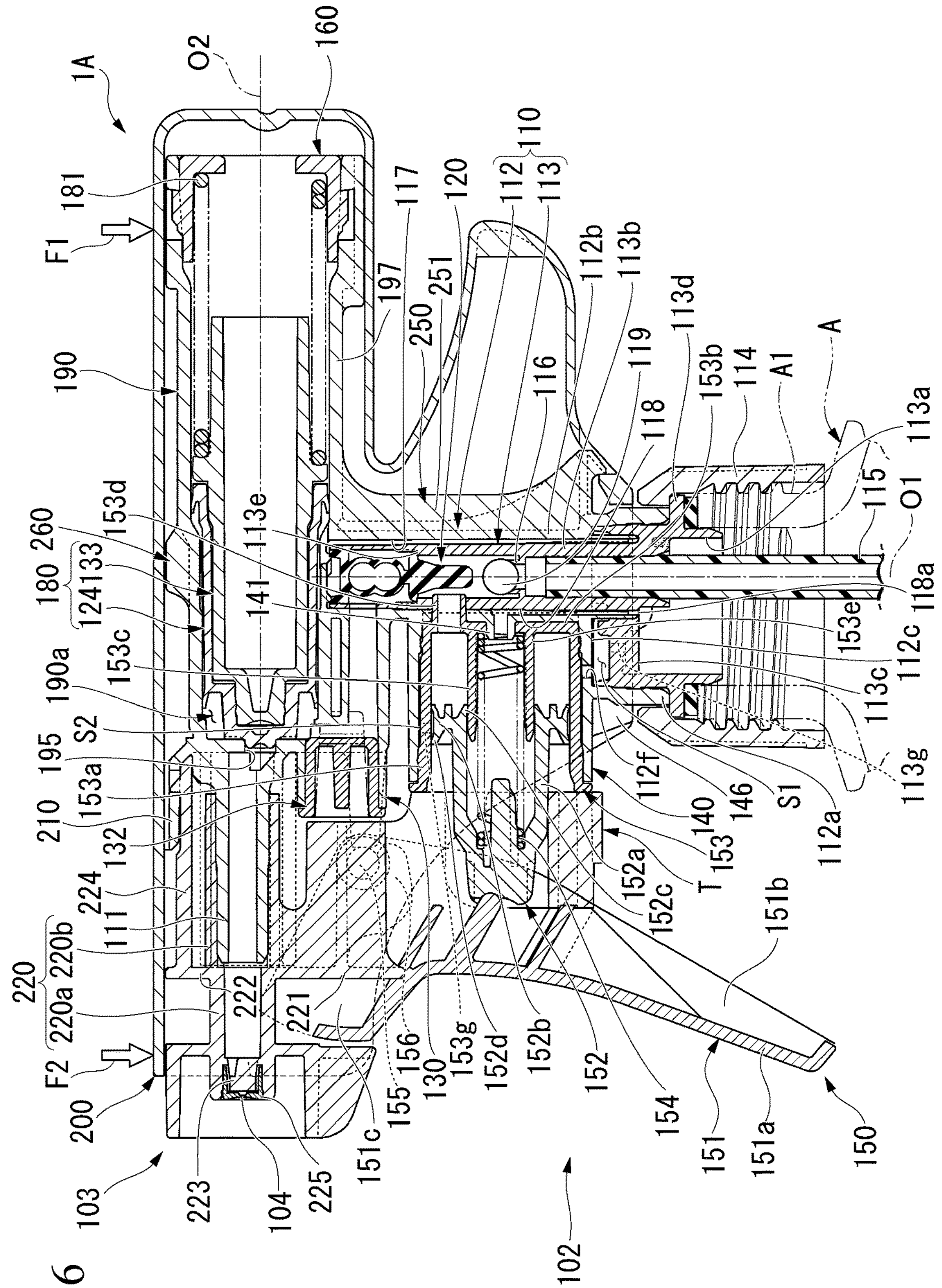
FIG. 6 is a longitudinal cross-sectional view illustrating a second embodiment of a trigger-type liquid sprayer according to the present invention.

As illustrated in FIG. 6, a trigger-type liquid sprayer 1A of the present embodiment includes a sprayer main body 102 which is mounted on the container body A accommodating a liquid therein, and a nozzle member 103 having a spray hole 104 for spraying a liquid and mounted on the sprayer main body 102.

Unless otherwise specified, each of the constituent components of the trigger-type liquid sprayer 1A is a molded article using a synthetic resin.

(Sprayer Main Body)

The sprayer main body 102 mainly includes a vertical supply tube 110, a mounting cap 114, an injection tube portion 111, a trigger mechanism 150, a reservoir cylinder 190, a support member 160, a reservoir plunger 180, a bias member 181, a ball valve 119, a reservoir valve 120, and a cover body 200.

In the present embodiment, a center axis of the vertical supply tube 110 will be referred to as an axis O1, a side of the container body A along the axis O1 will be referred to as a lower side, a side opposite thereto will be referred to as an upper side, and a direction along the axis O1 will be referred to as an upward/downward direction. In addition, in a plan view in the upward/downward direction, one direction intersecting the axis O1 will be referred to as a forward/rearward direction, and a direction orthogonal to both of the upward/downward direction and the forward/rearward direction will be referred to as a leftward/rightward direction.

Moreover, in the present embodiment, a center axis of the reservoir cylinder 190 will be regarded as an axis O2. In the present embodiment, the axis O2 extends in the forward/rearward direction. Therefore, in the present embodiment, the forward/rearward direction corresponds to the axial direction along the center axis of the reservoir cylinder 190.

In addition, in the present embodiment, a rear side corresponds to one side in the axial direction along the center axis of the reservoir cylinder 190, and a front side corresponds to the other side in the axial direction along the center axis of the reservoir cylinder 190. However, the axial direction along the axis O2 may not coincide with the forward/rearward direction.

The vertical supply tube 110 extends in the upward/downward direction and sucks up a liquid inside the container body A. The vertical supply tube 110 has an outer tube 112 having a topped cylindrical shape, and an inner tube 113 fitted into the outer tube 112. The axis O1 of the vertical supply tube 110 constituted of the outer tube 112 and the inner tube 113 is positioned behind the container axis of the container body A.

Figure 7:
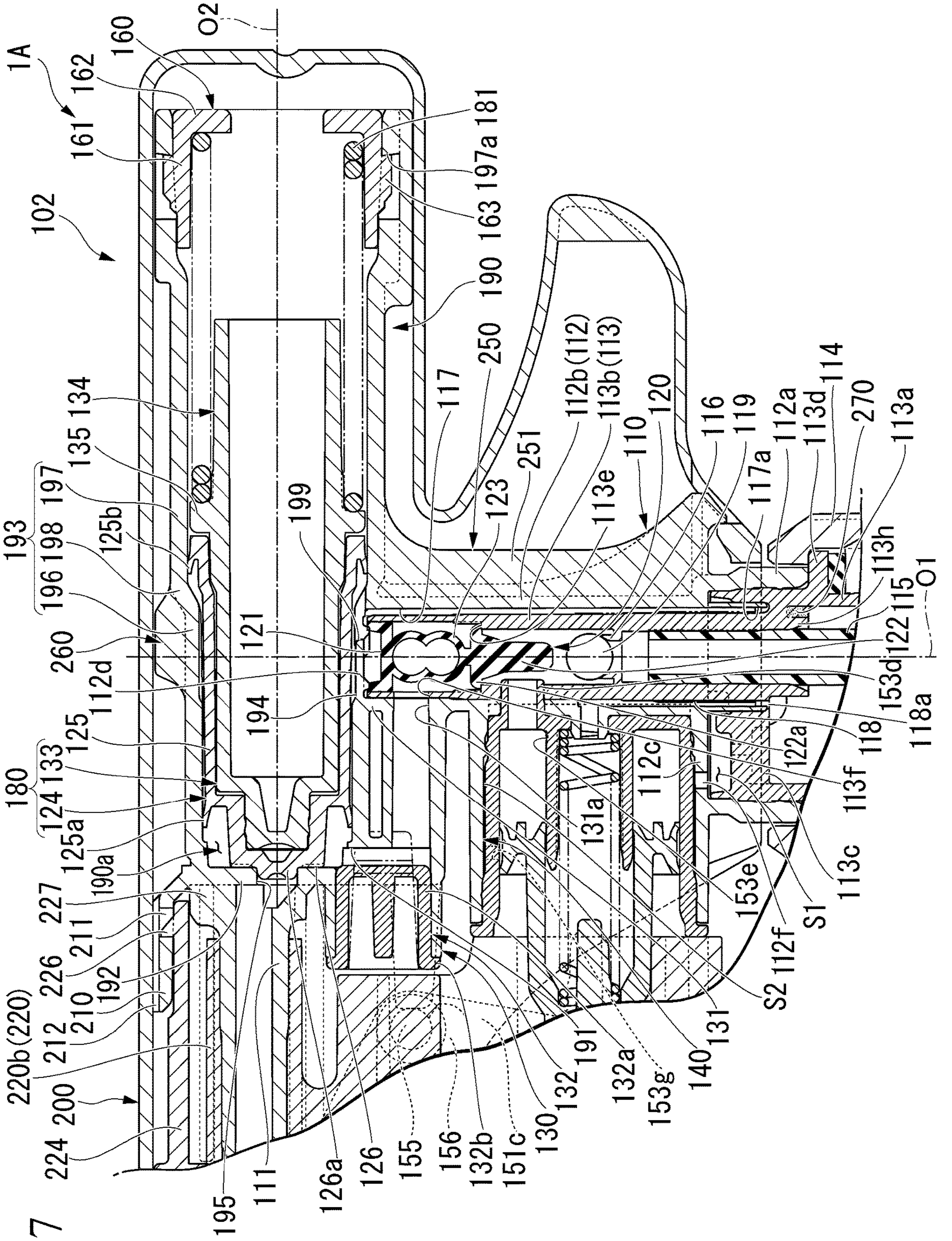
FIG. 7 is an enlarged longitudinal cross-sectional view of a part around a reservoir cylinder and a reservoir plunger illustrated in FIG. 6.

The outer tube 112 has a large diameter portion 112*a*, a small diameter portion 112*b* disposed above the large diameter portion 112*a* and having a diameter smaller than the large diameter portion 112*a*, and an annular connection portion 112*c* connecting an upper end portion of the large diameter portion 112*a* and a lower end portion of the small diameter portion 112*b* to each other. The small diameter portion 112*b* has a topped cylindrical shape and is located coaxially with the axis O1. As illustrated in FIG. 7, a top wall portion 112*d* of the small diameter portion 112*b* is formed integrally with the reservoir cylinder 190.

Accordingly, the outer tube 112 of the vertical supply tube 110 is formed integrally with the reservoir cylinder 190.

Figure 8:
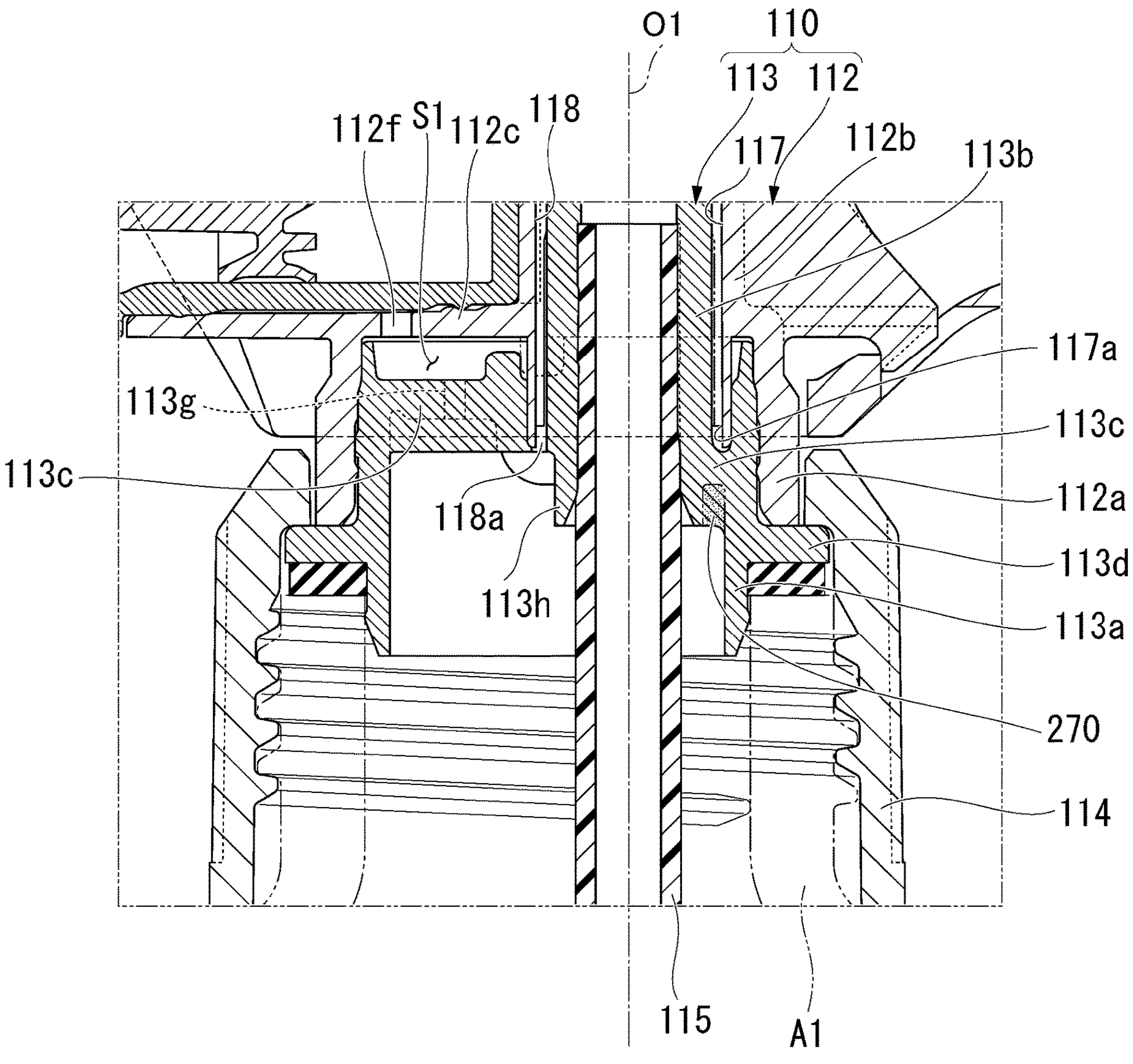
FIG. 8 is an enlarged longitudinal cross-sectional view of a periphery of an inner tube and a pipe illustrated in FIG. 6.

As illustrated in FIGS. 6 to 8, the inner tube 113 has a large diameter portion 113*a*, a small diameter portion 113*b* disposed radially inside the large diameter portion 113*a* and having a diameter smaller than the large diameter portion 113*a*, and an annular connection portion 113*c* connecting an inner circumferential surface of the large diameter portion 113*a* and an outer circumferential surface of the small diameter portion 113*b* to each other in the radial direction.

The large diameter portion 113*a* is located inside the large diameter portion 112*a* of the outer tube 112. A lower end portion of the large diameter portion 113*a* protrudes downward from the large diameter portion 112*a* of the outer tube 112 and is fitted into the mouth portion A1 of the container body A. An annular rim portion 113*d* protruding outward in the radial direction of the large diameter portion 113*a* is formed on a part of the large diameter portion 113*a* protruding downward from the large diameter portion 112*a* of the outer tube 112. The rim portion 113*d* is located inside an upper end portion of the mounting cap 114 mounted (for example, screwed) on the mouth portion A1 of the container body A and interlocks the upper end portion of the mounting cap 114 so as to be rotatable around the axis thereof. The rim portion 113*d* is interposed between the upper end portion of the mounting cap 114 and an upper end opening edge of the mouth portion A1 of the container body A in the upward/downward direction.

The small diameter portion 113*b* is located coaxially with the axis O1 and has a cylindrical shape opening on both sides in the upward/downward direction. The small diameter portion 113*b* is located inside the small diameter portion 112*b* of the outer tube 112. An upper end opening edge of the small diameter portion 113*b* is slightly separated downward from the top wall portion 112*d* of the outer tube 112. An upper portion of a pipe 115 extending in the upward/downward direction and sucking up a liquid from the container body A is fitted into the lower part of the small diameter portion 113*b*. A lower opening section of the pipe 115 is positioned in a bottom portion (not illustrated) of the container body A.

As illustrated in FIG. 8, the annular connection portion 113*c* is formed in a stepped state in the upward/downward direction such that a part of the annular connection portion 113*c* positioned behind the small diameter portion 113*b* is positioned below a part of the annular connection portion 113*c* positioned in front of the small diameter portion 113*b*. However, the annular connection portion 113*c* may be formed such that the height of the annular connection portion 113*c* is the same throughout the whole circumference.

A gap S1 in the upward/downward direction is provided between an upper surface of the annular connection portion 113*c* and a lower surface of the annular connection portion 112*c* of the outer tube 112.

An annular pipe fitting tube 113*h* protruding downward from the annular connection portion 113*c* is formed in the small diameter portion 113*b*. The pipe fitting tube 113*h* opens downward and has a tapered shape in a longitudinal cross-sectional view in which the inner circumferential surface of the pipe fitting tube 113*h* has a diameter that is gradually increased downward. The pipe 115 is fitted into the small diameter portion 113*b* by being inserted into the small diameter portion 113*b* from below through the pipe fitting tube 113*h*.

As illustrated in FIGS. 6 and 7, a valve seat portion 113*e* is formed on the inner circumferential surface of the inner tube 113. In the illustrated example, the valve seat portion 113*e* is formed by a step realized by making the inner diameter of a part of the inner tube 113 positioned above the valve seat portion 113*e* larger than the inner diameter of a part of the inner tube 113 positioned below the valve seat portion 113*e*. The reservoir valve 120 is seated on an upper surface of the valve seat portion 113*e*.

A support tube portion 116 having a cylindrical shape is provided on a part of the inner circumferential surface of the inner tube 113 positioned below the valve seat portion 113*e* and above an upper end portion of the pipe 115. The outer diameter of the support tube portion 116 is smaller than the inner diameter of the inner tube 113. The support tube portion 116 is located coaxially with the axis O1 and protrudes upward from the inner circumferential surface of the inner tube 113. The ball valve 119 is disposed on an upper end opening edge of the support tube portion 116 so as to be separable upward from the upper end opening edge.

A recovery path 117 is provided between the outer tube 112 and the inner tube 113 and positioned behind the axis O1. The recovery path 117 extends in the upward/downward direction, opens upward, and does not open downward.

Specifically, the recovery path 117 is a vertical groove formed on an inner circumferential surface of the small diameter portion 112*b* of the outer tube 112. The recovery path 117 is provided in the small diameter portion 112*b* throughout the overall length in the upward/downward direction. As illustrated in FIG. 8, a lower end portion of the recovery path 117 is closed from below by the annular connection portion 113*c* of the inner tube 113. The lower end portion of the recovery path 117 communicates with a residual pressure release path (connection path) 118 (which will be described below) through communication paths 117*a* and communicates with the inside of the container body A through a communication opening 118*a*.

For example, the recovery path 117 may be a vertical groove formed on an outer circumferential surface of the inner tube 113. Moreover, the recovery path 117 may be formed by combining vertical grooves respectively formed in the outer tube 112 and the inner tube 113.

The communication paths 117*a* extend in the circumferential direction of the vertical supply tube 110 from the recovery path 117 and allow the recovery path 117 and the residual pressure release path (connection path) 118 (which will be described below) to communicate with each other. The communication paths 117*a* extend forward from the lower end portion of the recovery path 117 and are connected to the residual pressure release path 118. For example, the communication path 117*a* has a circular arc shape. Two communication paths 117*a* are provided with the axis O1 interposed therebetween in the radial direction.

The communication paths 117*a* are circumferential grooves formed on the inner circumferential surface of the small diameter portion 112*b* of the outer tube 112 and extending in the circumferential direction. For example, the communication paths 117*a* may be circumferential grooves formed on the inner circumferential surface of the inner tube 113. Moreover, the communication paths 117*a* may be formed by combining circumferential grooves respectively formed in the outer tube 112 and the inner tube 113.

The communication paths 117*a* communicate with the inside of the container body A through the communication opening 118*a* (which will be described below). The communication paths 117*a* do not open downward (toward the inside of the container body A) at a part other than the communication opening 118*a*.

As illustrated in FIGS. 6 and 7, a connection tube portion 130 extending forward is provided in an upper end portion of the vertical supply tube 110.

The connection tube portion 130 has a bottomed cylindrical shape opening forward having a rear side closed. A bottom portion 131 of the connection tube portion 130 is formed integrally with an upper end portion of the outer tube 112. A penetration hole 131*a* penetrating the bottom portion 131 in the forward/rearward direction is formed in the bottom portion 131.

The penetration hole 131*a* opens toward a penetration hole 113*f* formed in an upper end portion of the inner tube 113. The penetration hole 113*f* is formed in a part of the small diameter portion 113*b* positioned above the valve seat portion 113*e* in the inner tube 113. Accordingly, the inside of the connection tube portion 130 communicates with the inside of a part of the inner tube 113 positioned above the valve seat portion 113*e* through the penetration hole 131*a* and the penetration hole 113*f*.

The inner diameter of the connection tube portion 130 is equal to or larger than the inner diameter of the inner tube 113. In addition, a closing plug 132 is tightly fitted into a front end portion of the connection tube portion 130.

The closing plug 132 includes a plug main body 132*a* and a flange portion 132*b*.

The plug main body 132*a* o has a bottomed cylindrical shape opening forward and having a rear side closed, and is tightly fitted into the front end portion of the connection tube portion 130. Accordingly, the closing plug 132 closes a front opening section of the connection tube portion 130.

The flange portion 132*b* projects outward from a front end opening edge of the plug main body 132*a*. The flange portion 132*b* abuts a front end opening edge of the connection tube portion 130 from the front when the plug main body 132*a* is mounted on the connection tube portion 130.

As illustrated in FIG. 6, a tube portion 140 for a cylinder is provided below the connection tube portion 130.

The tube portion 140 for a cylinder protrudes forward from the small diameter portion 112*b* of the outer tube 112 and opens forward. A rear part of a lower end portion of the tube portion 140 for a cylinder is formed integrally with the annular connection portion 112*c* of the outer tube 112.

For example, lower ribs 146 are provided around the tube portion 140 for a cylinder.

The lower ribs 146 are formed to be laid across the tube portion 140 for a cylinder and the large diameter portion 112*a*. For example, the lower ribs 146 are provided at positions avoiding a part immediately below the tube portion 140 for a cylinder. A pair of lower ribs 146 are provided with an interval therebetween in the circumferential direction around an axis of the tube portion 140 for a cylinder. An upper end of each of the lower ribs 146 is connected to an outer circumferential surface of the tube portion 140 for a cylinder, and a rear end of each of the lower ribs 146 is connected to an outer circumferential surface of the large diameter portion 112*a*. The lower ribs 146 may be provided immediately below the tube portion 140 for a cylinder.

A fitting tube portion 141 protruding forward from the small diameter portion 112*b* of the outer tube 112 and opening forward is provided inside the tube portion 140 for a cylinder.

The fitting tube portion 141 is located coaxially with the tube portion 140 for a cylinder. A front end portion of the fitting tube portion 141 is positioned behind a front end portion of the tube portion 140 for a cylinder.

As illustrated in FIGS. 7 and 8, the residual pressure release path (connection path) 118 extending in the upward/downward direction is formed between an inner circumferential surface of the outer tube 112 and the outer circumferential surface of the inner tube 113. The residual pressure release path 118 extends downward from a main cylinder 153, which will be described below. The residual pressure release path 118 is separated from the recovery path 117 around the axis O1 and is positioned in front of the recovery path 117 and the axis O1. Specifically, the residual pressure release path 118 is disposed in a front end portion of the vertical supply tube 110.

An upper end portion of the residual pressure release path 118 is positioned behind the fitting tube portion 141. The lower end portion of the residual pressure release path 118 communicates with the inside of the container body A through the communication opening 118*a* formed in the annular connection portion 113*c* of the inner tube 113.

Accordingly, the residual pressure release path 118 allows the inside of the fitting tube portion 141 and the inside of the container body A to communicate with each other through the communication opening 118*a* and the inside of the large diameter portion 113*a*. The residual pressure release path 118 discharges air inside the main cylinder 153 to the container body A. Moreover, the recovery path 117 communicates with the inside of the container body A through the communication paths 117*a*, the residual pressure release path 118, and the communication opening 118*a*.

For example, the residual pressure release path 118 may be formed by a vertical groove formed on the outer circumferential surface of the inner tube 113 or may be formed by combining vertical grooves respectively formed in the outer tube 112 and the inner tube 113.

As illustrated in FIG. 6, the injection tube portion 111 extends in the forward/rearward direction and communicates with the inside of the vertical supply tube 110 through the inside of the reservoir cylinder 190 and the inside of the connection tube portion 130. The injection tube portion 111 extends forward from a front wall portion 192 of the reservoir cylinder 190 and guides a liquid that has passed through the inside of the vertical supply tube 110 and the inside of the connection tube portion 130 to the spray hole 104. The center axis of the injection tube portion 111 is disposed parallel to the axis O2. In the illustrated example, the center axis of the injection tube portion 111 is positioned above the axis O2 of the reservoir cylinder 190.

The trigger mechanism 150 includes a trigger portion 151, the main cylinder 153, a main piston 152, and a coil spring (bias member) 154. The trigger mechanism 150 is configured to cause a liquid to flow from the inside of the vertical supply tube 110 toward the spray hole 104 in response to a rearward swing of the trigger portion 151.

The trigger portion 151 is disposed in front of the vertical supply tube 110 and configured to be movable rearward in a state in which the trigger portion 51 is biased forward. The trigger portion 151 is formed to extend in the upward/downward direction and is disposed below the injection tube portion 111.

An upper end portion of the trigger portion 151 is pivotally supported by the nozzle member 103 such that the trigger portion 151 is swingable in the forward/rearward direction. Specifically, the trigger portion 151 includes a main plate member 151*a* having a front surface curved in a shape recessed rearward in a side view in the leftward/rightward direction, and a pair of side plate members 151*b* standing up rearward from left and right side edge portions of the main plate member 151*a*.

A pair of connection plates 151*c* are formed in upper end portions of the pair of side plate members 151*b*, the pair of connection plates 151*c* extending upward to reach lateral portions of the nozzle member 103 and sandwiching the nozzle member 103 in the leftward/rightward direction. Rotary shaft portions 155 protruding outward in the leftward/rightward direction are provided on the pair of connection plates 151*c*. The rotary shaft portions 155 are rotatably supported by bearing portions 156 provided on the lateral portions of the nozzle member 103.

Accordingly, the trigger portion 151 is supported to be swingable in the forward/rearward direction about the rotary shaft portions 155.

As illustrated in FIGS. 6 and 7, the main cylinder 153 is disposed behind the trigger portion 151 and faces the trigger portion 151 in the forward/rearward direction. The main cylinder 153 has an outer tube portion 153*a* opening forward, a rear wall portion 153*b* closing a rear end opening of the outer tube portion 153*a*, a tubular piston guide 153*c* protruding forward from a center part of the rear wall portion 153*b*, and a tubular communication tube portion 153*d* protruding rearward from a part of the rear wall portion 153*b* positioned above the piston guide 153*c* and opening on both sides in the forward/rearward direction.

The outer tube portion 153*a* is disposed coaxially with the tube portion 140 for a cylinder and is fitted into the tube portion 140 for a cylinder. An inner circumferential surface of the tube portion 140 for a cylinder and an outer circumferential surface of the outer tube portion 153*a* are in tight-contact with each other in both end portions in the forward/rearward direction. An annular gap S2 is provided between the inner circumferential surface of the tube portion 140 for a cylinder and the outer circumferential surface of the outer tube portion 153*a*, the annular gap S2 being positioned in an intermediate portion between the above described both end portions in the forward/rearward direction.

A first vent hole 153*g* allowing the inside of the outer tube portion 153*a* and the gap S2 to communicate with each other is formed in the outer tube portion 153*a*. As illustrated in FIG. 6, a second vent hole 112*f* allowing the gap S2 and the gap S1 between the annular connection portion 112*c* of the outer tube 112 and the annular connection portion 113*c* of the inner tube 113 to communicate with each other is formed in the annular connection portion 112*c* of the outer tube 112. Moreover, a third vent hole 113*g* allowing the gap S1 and the inside of the mounting cap 114 to communicate with each other is formed in the annular connection portion 113*c* of the inner tube 113.

The communication tube portion 153*d* is fitted into the penetration holes formed in the outer tube 112 and the inner tube 113. The inside of the inner tube 113 of the vertical supply tube 110 and the inside of the main cylinder 153 communicate with each other through the inside of the communication tube portion 153*d*. A rear end portion of the communication tube portion 153*d* protrudes into the inner tube 113.

The penetration hole of the inner tube 113 into which the communication tube portion 153*d* is fitted opens in a part of the small diameter portion 113*b* of the inner tube 113 positioned between the valve seat portion 113*e* and the support tube portion 116. Therefore, the ball valve 119 separably seated on the upper end opening edge of the support tube portion 116 can switch to bring the inside of the container body A and the inside of the main cylinder 153 in communication with each other and block the communication.

The ball valve 119 is a check valve blocking communication between the inside of the container body A and the inside of the main cylinder 153 through the inside of the vertical supply tube 110 when the inside of the main cylinder 153 is compressed, and allowing communication between the inside of the container body A and the inside of the main cylinder 153 through the inside of the vertical supply tube 110 by being displaced upward when the inside of the main cylinder 153 is decompressed.

Since the reservoir valve 120 is disposed above the ball valve 119, excessive upward displacement of the ball valve 119 is restricted by the reservoir valve 120. Excessive upward displacement of the ball valve 119 may be restricted by the rear end portion of the communication tube portion 153*d*.

The piston guide 153*c* has a bottomed cylindrical shape opening forward and having a rear side closed and is disposed inside the outer tube portion 153*a*. A front end portion of the piston guide 153*c* is positioned behind a front end portion of the outer tube portion 153*a*. A bottom portion of the piston guide 153*c* has an annular shape, and the fitting tube portion 141 is fitted into the bottom portion. The front end portion of the fitting tube portion 141 protrudes into the piston guide 153*c*.

The piston guide 153*c* is located coaxially with the fitting tube portion 141. An annular recessed portion 153*e* is formed on an outer circumferential surface of a rear end portion of the piston guide 153*c*.

The main piston 152 is disposed inside the main cylinder 153 and configured to be movable in the forward/rearward direction, and is moved in the forward/rearward direction in association with a swing of the trigger portion 151. The inside of the main cylinder 153 is compressed and decompressed in response to movement of the main piston 152 in the forward/rearward direction.

The main piston 152 has a topped cylindrical shape opening rearward and having a front side closed and is located coaxially with the main cylinder 153. The main piston 152 is interlocked with an intermediate portion of the trigger portion 151 in the upward/downward direction.

The main piston 152 is biased forward together with the trigger portion 151 due to a biasing force of the coil spring 154. The main piston 152 moves rearward in response to a rearward swing of the trigger portion 151 and is thrust into the main cylinder 153.

The main piston 152 has a piston main body portion 152*a* which opens rearward and into which the piston guide 153*c* is inserted, and a sliding tube portion 152*b* which protrudes outward in the radial direction of the piston main body portion 152*a* from a rear end portion of the piston main body portion 152*a* and comes into sliding-contact with an inner circumferential surface of the outer tube portion 153*a*.

The piston main body portion 152*a* has a topped cylindrical shape opening rearward and having a front side closed. The inner diameter of the piston main body portion 152*a* is slightly larger than the outer diameter of the piston guide 153*c*. A front end portion of the piston main body portion 152*a* abuts the trigger portion 151 from behind and is interlocked with the trigger portion 151.

An annular inner lip portion 152*c* protruding inward in the radial direction of the piston main body portion 152*a* and coming into sliding-contact with an outer circumferential surface of the piston guide 153*c* is formed in the rear end portion of the piston main body portion 152*a*. Accordingly, sealability is secured between the inner lip portion 152*c* and the outer circumferential surface of the piston guide 153*c*.

When the main piston 152 moves rearward and the inner lip portion 152*c* reaches the recessed portion 153*e* of the piston guide 153*c*, a slight gap is formed between the inner lip portion 152*c* and the recessed portion 153*e*. Through this gap, the inside of the outer tube portion 153*a* of the main cylinder 153 communicates with a gap between an inner circumferential surface of the piston main body portion 152*a* and the outer circumferential surface of the piston guide 153*c*. Accordingly, the inside of the outer tube portion 153*a* communicates with the inside of the fitting tube portion 141 through the inside of the piston guide 153*c*.

The inner lip portion 152*c* reaches the recessed portion 153*e* when the main piston 152 is positioned at the rearmost position.

The sliding tube portion 152*b* has a diameter that is increased forward and rearward from a central portion in the forward/rearward direction. The sliding tube portion 152*b* has outer lip portions 152*d* positioned in both end portions thereof in the forward/rearward direction. The outer lip portions 152*d* come into tight sliding-contact with the inner circumferential surface of the outer tube portion 153*a*. Accordingly, sealability is secured between the outer lip portions 152*d* and the inner circumferential surface of the outer tube portion 153*a*.

When the trigger portion 151 is at the foremost swing position, the main piston 152 is positioned at the foremost position corresponding thereto. At this time, the sliding tube portion 152*b* closes the first vent hole 153*g* formed in the outer tube portion 153*a*. Further, when the main piston 152 moves rearward from the foremost position by a predetermined amount in response to a rearward swing of the trigger portion 151, the sliding tube portion 152*b* opens the first vent hole 153*g*. Accordingly, the first vent hole 153*g* is opened to the outside of the trigger-type liquid sprayer 1A through the inside of the outer tube portion 153*a*.

According to this, the inside of the container body A can communicate with the outside of the trigger-type liquid sprayer 1A through the third vent hole 113*g* formed in the annular connection portion 113*c* of the inner tube 113, the gap S1, the second vent hole 112*f*, the gap S2, and the first vent hole 153*g*.

The coil spring (bias member) 154 is made of a metal, is located coaxially with the main piston 152 and the main cylinder 153, and biases the trigger portion 151 forward via the main piston 152.

The coil spring 154 is disposed to straddle the inside of the piston guide 153*c* and the inside of the piston main body portion 152*a*. A rear end portion of the coil spring 154 is supported by the bottom portion (the rear wall portion 153*b*) of the piston guide 153*c* in a state of surrounding the front end portion of the fitting tube portion 141. A front end portion of the coil spring 154 is supported by a stepped surface which is formed inside the piston main body portion 152*a* and faces the rear side.

A material of the coil spring 154 is not limited to a metal, and a resin spring or the like may be employed, for example.

The stopper T is provided in a gap in the forward/rearward direction between the trigger portion 151 and the main cylinder 153 in an attachable/detachable manner.

The stopper T is a restriction member restricting a rearward swing of the trigger portion 151 by abutting the trigger portion 151 and the main cylinder 153. A user may discard the detached stopper T or may reattach the stopper T after using the trigger-type liquid sprayer 1A to restrict rearward swing of the trigger portion 151.

As illustrated in FIGS. 6 and 7, the reservoir cylinder 190 is disposed above the vertical supply tube 110 and the connection tube portion 130. A liquid that has passed through the inside of the vertical supply tube 110 and the inside of the connection tube portion 130 is supplied to the inside of the reservoir cylinder 190 in response to a rearward swing of the trigger portion 151. The reservoir cylinder 190 extends in the forward/rearward direction to straddle the vertical supply tube 110 in the forward/rearward direction and is disposed substantially parallel to the connection tube portion 130 and the tube portion 140 for a cylinder in the illustrated example. A lower end portion of the reservoir cylinder 190 is formed integrally with the upper end portion of the vertical supply tube 110 and an upper end portion of the connection tube portion 130.

The reservoir cylinder 190 has the front wall portion 192 positioned at the front end and a cylinder tube 193 extending rearward from the front wall portion 192, and the entirety of the reservoir cylinder 190 has a topped cylindrical shape opening rearward and having a front side closed.

The front wall portion 192 protrudes upward from an intermediate part of the connection tube portion 130 in the forward/rearward direction. A communication hole 195 penetrating the front wall portion 192 in the forward/rearward direction is formed in the front wall portion 192. The communication hole 195 has a circular shape and is located coaxially with the axis O2. Accordingly, a storage space 190*a* (which will be described below) inside the reservoir cylinder 190 and the inside of the injection tube portion 111, which communicates with the spray hole 104, communicate with each other through the communication hole 195. The communication hole 195 may be formed in the cylinder tube 193.

The cylinder tube 193 has a front tube portion 196 extending rearward from the front wall portion 192, a rear tube portion 197 having an outer diameter and an inner diameter larger than those of the front tube portion 196 and positioned behind the front tube portion 196, and a stepped portion 198 connecting the front tube portion 196 and the rear tube portion 197 to each other in the forward/rearward direction.

The stepped portion 198 has a diameter that is increased rearward from the front. The top wall portion 112*d* of the outer tube 112 is connected to a connected portion between the front tube portion 196 and the stepped portion 198, more specifically, to a part of the connected portion positioned at a lower part of the cylinder tube 193.

The rear tube portion 197 is positioned behind the vertical supply tube 110. For this reason, the rear tube portion 197 functions as a rear cylinder portion protruding rearward beyond the vertical supply tube 110 in the reservoir cylinder 190. The rear tube portion 197 is formed integrally with the upper end portion of the vertical supply tube 110.

Moreover, a supply hole 191, communication grooves 194, and a recovery hole 199 are formed in the reservoir cylinder 190.

The supply hole 191 is formed at a lower part of the front end portion of the front tube portion 196 and opens in a part of the connection tube portion 130 positioned behind the plug main body 132*a*. Accordingly, a liquid that has passed through the inside of the vertical supply tube 110 and the inside of the connection tube portion 130 is supplied to the inside of the reservoir cylinder 190 through the supply hole 191.

The communication grooves 194 are formed on an inner circumferential surface of a rear portion of the front tube portion 196. A plurality of communication grooves 194 are disposed with an interval therebetween around the axis O2.

The recovery hole 199 penetrates the connected portion between the front tube portion 196 and the stepped portion 198 and the top wall portion 112*d* of the outer tube 112, which are integrally formed, in the upward/downward direction. The recovery hole 199 opens toward an upper end portion of the recovery path 117 provided in the vertical supply tube 110. Accordingly, the recovery hole 199 communicates with the inside of the container body A through the recovery path 117. A rear end portion of the communication groove 194 of the plurality of communication grooves 194 positioned on the lower side opens in a front end portion of the recovery hole 199.

The support member 160 is fixed to a rear end portion of the reservoir cylinder 190 and is located coaxially with the axis O2. The support member 160 has a support wall portion 162 positioned at the rear end and a fixed tube portion 161 extending forward from the support wall portion 162, and the entirety of the support member 160 has a bottomed cylindrical shape opening forward and having a rear side closed.

The fixed tube portion 161 is fitted into the rear end portion of the reservoir cylinder 190 in a state in which rearward movement and rotative movement around the axis O2 are restricted. The support wall portion 162 has an annular shape. The inside of a part of the reservoir cylinder 190 positioned behind the reservoir plunger 180 communicates with the outside through the inside of the support wall portion 162.

Interlock protrusions 163 protruding forward are formed in the support wall portion 162. A plurality of interlock protrusions 163 are provided with an interval therebetween around the axis O2 and are interlocked with the inside of interlock recesses 197*a* formed in the rear tube portion 197 from the front. Accordingly, rearward detachment of the fixed tube portion 161 from the reservoir cylinder 190 is restricted.

The reservoir plunger 180 is disposed inside the reservoir cylinder 190 and configured to be movable in the forward/rearward direction along the axis O2. The reservoir plunger 180 moves rearward in response to supply of a liquid to the inside of the reservoir cylinder 190. The reservoir plunger 180 blocks communication between the inside of the vertical supply tube 110 and the spray hole 104 through the communication hole 195, and when the reservoir plunger 180 moves rearward, the reservoir plunger 180 allows the inside of the vertical supply tube 110 and the spray hole 104 to communicate with each other through the communication hole 195.

The reservoir plunger 180 has a slide member 124 sliding inside the reservoir cylinder 190 in the forward/rearward direction, and a reception member 133 fitted into the slide member 124. The slide member 124 and the reception member 133 have a tubular shape extending in the forward/rearward direction and are located coaxially with the axis O2.

For example, the slide member 124 is formed of a material softer than those of the reception member 133 and the reservoir cylinder 190 and has a plunger tube 125 extending in the forward/rearward direction and a closing wall 126 closing a front end opening of the plunger tube 125.

A front lip portion 125*a* and a rear lip portion 125*b* are formed on an outer circumferential surface of the plunger tube 125 throughout the whole circumference.

The front lip portion 125*a* closely slides on an inner circumferential surface of the front tube portion 196 of the cylinder tube 193 in the forward/rearward direction. Accordingly, sealability is secured between the front lip portion 125*a* and the inner circumferential surface of the front tube portion 196.

Specifically, the front lip portion 125*a* has a cylindrical shape protruding forward from the outer circumferential surface of the plunger tube 125. A gap is provided between an inner circumferential surface of the front lip portion 125*a* and an outer circumferential surface of the front end portion of the plunger tube 125. Moreover, the front end portion of the plunger tube 125 positioned in front of the front lip portion 125*a* has a diameter smaller than a part of the plunger tube 125 positioned behind the front end portion. A gap is provided between the outer circumferential surface of the front end portion of the plunger tube 125 and an inner circumferential surface of the reservoir cylinder 190.

Further, the inward side of the front lip portion 125*a* and the supply hole 191 formed in the reservoir cylinder 190 open in this gap. Therefore, this gap functions as the storage space 190*a* storing a liquid that has passed through the inside of the vertical supply tube 110 and expanding when the reservoir plunger 180 moves rearward in response to supply of the liquid.

The rear lip portion 125*b* closely slides on an inner circumferential surface of the rear tube portion 197 of the cylinder tube 193 in the forward/rearward direction. Accordingly, sealability is secured between the rear lip portion 125*b* and the inner circumferential surface of the rear tube portion 197. The rear lip portion 125*b* has a cylindrical shape protruding forward from an outer circumferential edge of a rear end of the plunger tube 125. A gap is provided between an inner circumferential surface of the rear lip portion 125*b* and the outer circumferential surface of the rear end portion of the plunger tube 125.

The closing wall 126 is pressed against a rear surface of the front wall portion 192 of the reservoir cylinder 190, more specifically, against a part of the rear surface positioned around an opening circumferential edge portion of the communication hole 195. A protrusion portion 126*a* protruding forward is formed on a front surface of the closing wall 126.

The protrusion portion 126*a* has a truncated cone shape located coaxially with the axis O2. The protrusion portion 126*a* has an outer diameter that is decreased forward from the rear. Accordingly, the communication hole 195 is closed when an outer circumferential surface of the protrusion portion 126*a* abuts an inner surface of a rear end portion of the communication hole 195.

The reception member 133 has a reception tube 134 and a reception seat portion 135.

The reception tube 134 has a topped cylindrical shape opening rearward and having a front side closed and is disposed inside the plunger tube 125. A rear part of the reception tube 134 protrudes rearward from a rear opening section of the plunger tube 125 and is disposed inside the rear tube portion 197 of the cylinder tube 193. The outer diameter of the reception tube 134 is smaller than the inner diameter of the rear tube portion 197. Accordingly, an annular gap is provided between an outer circumferential surface of the rear part of the reception tube 134 and the inner circumferential surface of the rear tube portion 197. Further, the front part of the bias member 81 is inserted into this gap.

The reception seat portion 135 has a flange shape protruding from the outer circumferential surface of the rear part in the reception tube 134. A front surface of the reception seat portion 135 abuts or approaches a rear end opening edge of the plunger tube 125.

The bias member 181 biases the reservoir plunger 180 forward. The bias member 181 surrounds the rear part of the reception tube 134 and is disposed between the reception seat portion 135 and the support wall portion 162 of the support member 160 in a state of being compressed in the forward/rearward direction. Accordingly, a front end edge of the bias member 181 abuts a rear surface of the reception seat portion 135, and a rear end edge of the bias member 181 abuts a front surface of the support wall portion 162.

The bias member 181 is a metal coil spring located coaxially with the axis O2. However, it is not limited to this case. For example, a resin spring may be used or other members having elasticity may be used as the bias member 181.

When the reservoir plunger 180 moves rearward against the bias member 181 and the closing wall 126 is separated rearward from the front wall portion 192 of the reservoir cylinder 190, the communication hole 195 is opened. A liquid in the storage space 190*a* of the reservoir cylinder 190 is compressed until the reservoir plunger 180 moves rearward. When the liquid pressure in the storage space 190*a* reaches a predetermined value, the reservoir plunger 180 moves rearward against the bias member 181. Accordingly, a liquid in the storage space 190*a* can be supplied to the spray hole 104 side through the communication hole 195. Therefore, the reservoir plunger 180 functions as an accumulator valve.

The reservoir valve 120 is provided inside the inner tube 113 of the vertical supply tube 110.

The reservoir valve 120 is a check valve allowing supply of a liquid to the inside of the reservoir cylinder 190 from the inside of the vertical supply tube 110 and restricting outflow of a liquid to the inside of the vertical supply tube 110 from the inside of the reservoir cylinder 190. Specifically, the reservoir valve 120 has a fixed portion 121 fixed inside the upper end portion of the inner tube 113, a valve main body portion 122 disposed on the upper surface of the valve seat portion 113*e*, and an elastic deformation portion 123 connecting the fixed portion 121 and the valve main body portion 122 to each other.

The fixed portion 121 has a disk shape and is tightly fitted into the upper end portion of the inner tube 113.

The valve main body portion 122 has a pillar shape extending in the upward/downward direction and faces a rear end opening of the communication tube portion 153*d* in the forward/rearward direction. A lower end surface of the valve main body portion 122 faces the ball valve 119 in the upward/downward direction.

A flange-shaped valve plate portion 122*a* is formed on a part of an outer circumferential surface of the valve main body portion 122 positioned above the communication tube portion 153*d*, and disposed on the upper surface of the valve seat portion 113*e* so as to be separable upward from the upper surface. The elastic deformation portion 123 is elastically deformable in the upward/downward direction. When the inside of the main cylinder 153 is compressed, the elastic deformation portion 123 is compressively deformed upward due to upward displacement of the valve main body portion 122. That is, the valve plate portion 122*a* is separated upward from the valve seat portion 113*e* so as to allow supply of a liquid into the reservoir cylinder 190 from the inside of the vertical supply tube 110.

The cover body 200 is formed to cover the entirety of the vertical supply tube 110 except for the lower end portion, the entirety of the injection tube portion 111, and the entirety of the reservoir cylinder 190 from at least both sides in the leftward/rightward direction and above.

As illustrated in FIGS. 6 and 7, a first connection plate 210 is formed above the injection tube portion 111.

The first connection plate 210 has a plate shape extending forward from an upper end portion of the front wall portion 192 of the reservoir cylinder 190. Accordingly, the first connection plate 210 has a rectangular shape extending in the forward/rearward direction and the leftward/rightward direction in a plan view.

An interlock hole 211 penetrating the first connection plate 210 in the upward/downward direction is formed in the first connection plate 210. The shape of the interlock hole 211 is not particularly limited. However, for example, the interlock hole 211 may be formed to open in a rectangular shape in a plan view.

Moreover, expansion portions 212 protruding upward and coming into contact with the cover body 200 from below are formed on an upper surface of the first connection plate 210.

For example, the expansion portion 212 expands upward in a hemispherical shape in a longitudinal cross-sectional view and is formed in a laterally long shape extending in the forward/rearward direction throughout the overall length of the first connection plate 210. A pair of expansion portions 212 extend parallel to each other and are arranged in the leftward/rightward direction with the interlock hole 211 interposed therebetween.

The shape and position of the expansion portion 212 are not limited to this case and may be suitably changed.

As the expansion portions 212 of the first connection plate 210 come into contact with the cover body 200 from below, upward displacement of the first connection plate 210 is curbed.

(Nozzle Member)

As illustrated in FIGS. 6 and 7, the nozzle member 103 is assembled to the sprayer main body 102 mainly utilizing the injection tube portion 111.

The nozzle member 103 includes a mounting tube portion 220 externally fitted to the injection tube portion 111 from the front, a restriction wall 221 extending downward from the mounting tube portion 220, a connection wall 222 extending upward from the mounting tube portion 220, a nozzle shaft portion 223 disposed inside the front end portion of the mounting tube portion 220, and a second connection plate 224 extending rearward from the connection wall 222.

The mounting tube portion 220 includes a front tube portion 220*a* extending forward from the restriction wall 221 and the connection wall 222, and a rear tube portion 220*b* extending rearward from the restriction wall 221 and the connection wall 222. The rear tube portion 220*b* of the mounting tube portion 220 is tightly externally fitted to the injection tube portion 111 from the front side.

The rear tube portion 220*b* of the mounting tube portion 220 is not externally fitted to the injection tube portion 111 throughout the overall length thereof and is externally fitted to a base end portion of the injection tube portion 111, that is, a part of the injection tube portion 111 excluding the rear end portion (root side). Accordingly, a rear end edge of the rear tube portion 220*b* is disposed in front of the front wall portion 192 in a state in which a gap in the forward/rearward direction is provided between the rear end edge of the rear tube portion 220*b* and the front wall portion 192.

The nozzle shaft portion 223 is disposed inside the front tube portion 220*a* in the mounting tube portion 220 and coaxially with the injection tube portion 111. A center axis of the nozzle shaft portion 223 is positioned slightly above the axis O2 of the reservoir cylinder 190. A front end portion of the nozzle shaft portion 223 is positioned slightly behind a front end portion of the front tube portion 220*a* of the mounting tube portion 220.

A nozzle cap 225, which opens forward and in which the spray hole 104 for spraying a liquid forward is formed, is mounted on the nozzle shaft portion 223. The spray hole 104 is located coaxially with the injection tube portion 111. A communication path (not illustrated) allowing the inside of a part of the front tube portion 220*a* of the mounting tube portion 220 positioned behind the nozzle shaft portion 223 and the spray hole 104 to communicate with each other is provided between an outer surface of the nozzle shaft portion 223 and an inner surface of the nozzle cap 225.

As a lower end edge of the restriction wall 221 abuts an upper end portion of the trigger portion 151 from above, the restriction wall 221 positions the trigger portion 151 at the foremost swing position and restricts further forward swinging of the trigger portion 151.

The second connection plate 224 has a plate shape extending rearward from an upper end portion side of the connection wall 222. Accordingly, the second connection plate 224 has a rectangular shape extending in the forward/rearward direction and the leftward/rightward direction in a plan view and is disposed parallel to the first connection plate 210. The second connection plate 224 is positioned between the mounting tube portion 220 and the first connection plate 210 and is disposed so as to overlap the first connection plate 210 from below.

An interlock protrusion 226 protruding upward is formed on the second connection plate 224, and enters the interlock hole 211 formed in the first connection plate 210 and is interlocked with the interlock hole 211 from behind. Accordingly, the entirety of the nozzle member 103 is assembled to the injection tube portion 111 in a locked state such that the nozzle member 103 is prevented from relatively moving forward with respect to the injection tube portion 111.

Moreover, the second connection plate 224 extends rearward beyond the mounting tube portion 220 and surrounds a rear end portion side of the injection tube portion 111. In addition to this, the second connection plate 224 is sandwiched between the first connection plate 210 and the injection tube portion 111 in the upward/downward direction. Specifically, a protrusion portion 227 protruding upward and disposed below a rear end portion of the second connection plate 224 is formed on an outer circumferential surface of the injection tube portion 111 on the rear end portion side positioned behind the mounting tube portion 220, such that the rear end portion of the second connection plate 224 is sandwiched between the protrusion portion 227 and the first connection plate 210. In the illustrated example, the protrusion portion 227 has a rib shape extending in the forward/rearward direction.

In the trigger-type liquid sprayer 1A, as illustrated in FIGS. 6 and 7, a displacement curbing portion 250 for curbing displacement of the rear tube portion (rear cylinder portion) 197 of the reservoir cylinder 190 with respect to the vertical supply tube 110 is provided between the rear tube portion 197 and the vertical supply tube 110. The displacement curbing portion 250 includes a reinforcement rib 251 which is formed integrally with the vertical supply tube 110 and the rear tube portion 197 such that the vertical supply tube 110 and the rear tube portion 197 are integrally connected to each other.

The reinforcement rib 251 is formed to integrally connect the small diameter portion 112*b* of the outer tube 112 of the vertical supply tube 110 and the rear tube portion 197 to each other. Specifically, the reinforcement rib 251 is formed on an outer circumferential surface of a rear portion of the small diameter portion 112*b* and has a longitudinal rib shape extending in the upward/downward direction throughout the overall length of the small diameter portion 112*b*. A lower end portion of the reinforcement rib 251 reaches the annular connection portion 112*c* of the outer tube 112 and is formed integrally with the annular connection portion 112*c*. An upper end portion of the reinforcement rib 251 reaches the rear tube portion 197 and is formed integrally with the rear tube portion 197.

Accordingly, the vertical supply tube 110 and the rear tube portion 197 are firmly integrally connected to each other with the reinforcement rib 251 therebetween. Particularly, since the reinforcement rib 251 is interposed between the annular connection portion 112*c* and the rear tube portion 197 in the upward/downward direction, it is possible to effectively curb displacement of the rear tube portion 197 in the upward/downward direction with respect to the vertical supply tube 110.

Figure 9:
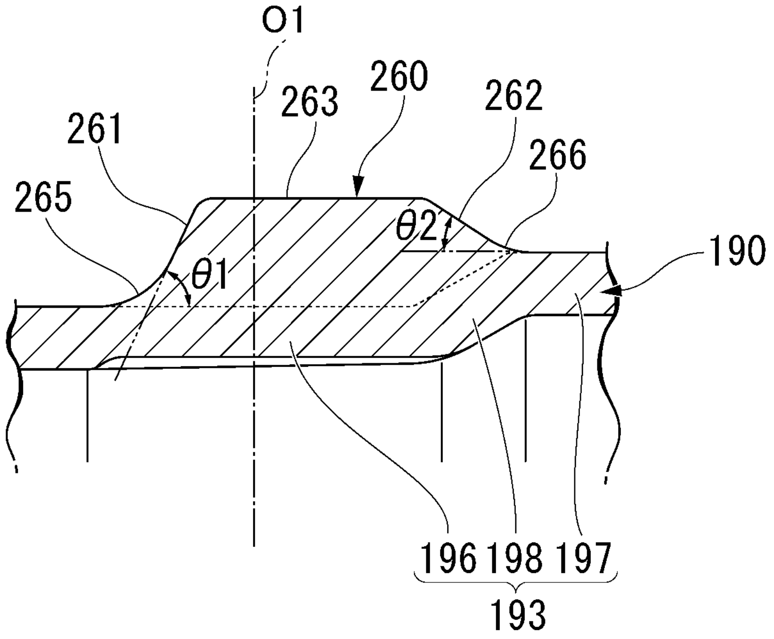
FIG. 9 is an enlarged longitudinal cross-sectional view of an upper rib illustrated in FIG. 6.
Figure 10:
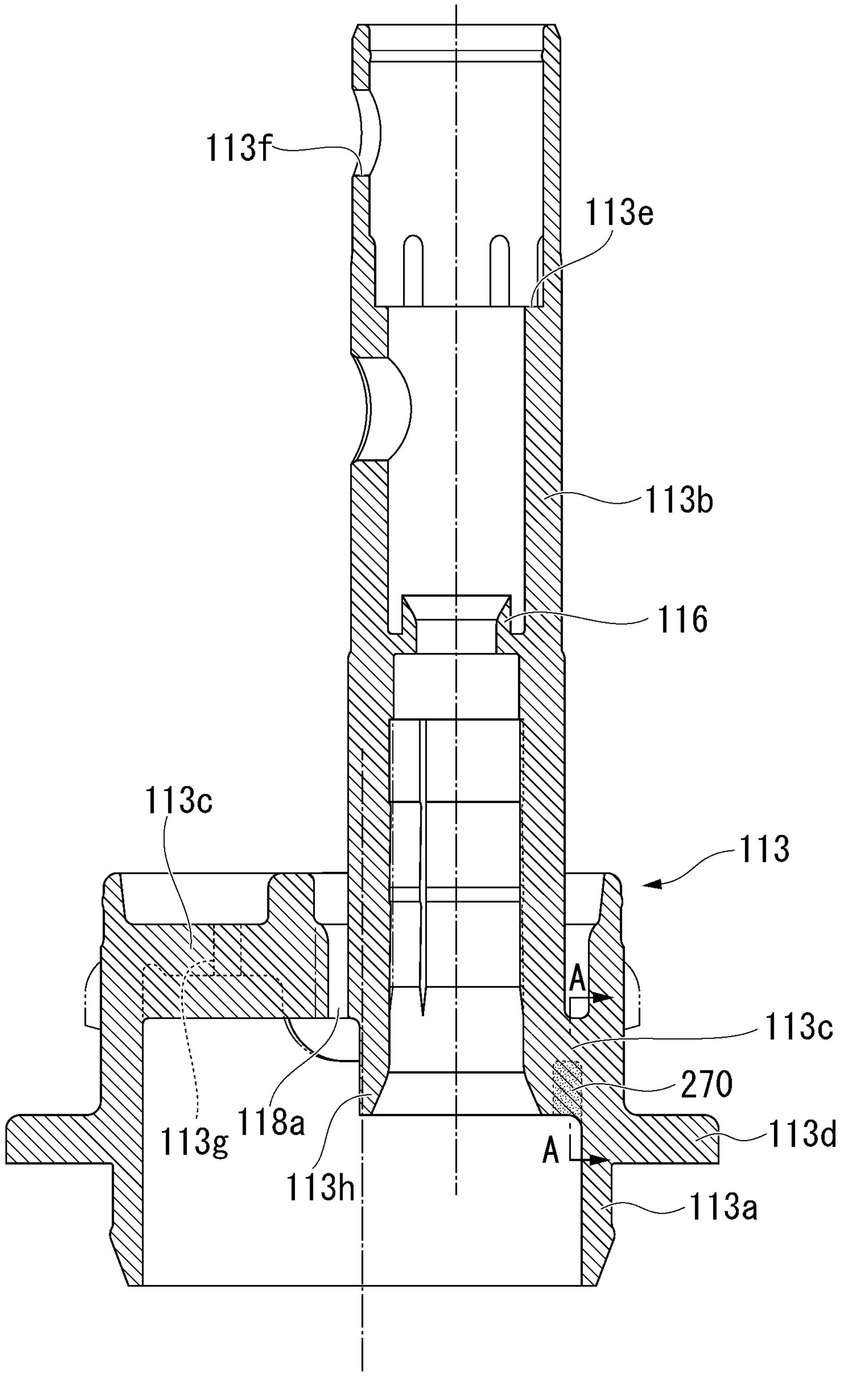
FIG. 10 is a longitudinal cross-sectional view of the inner tube illustrated in FIG. 6.

Moreover, in the trigger-type liquid sprayer 1A of the present embodiment, as illustrated in FIGS. 7 and 9, an upper rib 260 is formed integrally on the outer circumferential surface of an upper end portion of the reservoir cylinder 190.

The upper rib 260 protrudes upward, is positioned on the axis O1 of the vertical supply tube and extends in the forward/rearward direction. Specifically, the upper rib 260 is formed on an upper part of the cylinder tube 193 and positioned in the connected portion between the front tube portion 196 and the stepped portion 198 in the cylinder tube 193.

The upper rib 260 includes a front wall surface (first wall surface) 261 facing the front side (the other side in the axial direction), a rear wall surface (second wall surface) 262 facing the rear side (one side in the axial direction), a pair of side wall surfaces (not illustrated) facing outward in the leftward/rightward direction and connected to the front wall surface 261 and the rear wall surface 262, and a flat top wall surface 263 disposed above the front tube portion 196 and connected to the front wall surface 261, the rear wall surface 262, and the pair of side wall surfaces.

Both of the front wall surface 261 and the rear wall surface 262 of the upper rib 260 are inclined surfaces spreading outward and downward from the top wall surface 263. The rear wall surface 262 is disposed such that it covers the stepped portion 198 from above and is connected to a boundary part between the stepped portion 198 and the rear tube portion 197.

As illustrated in FIG. 9, the front wall surface 261 is an inclined surface inclined to extend rearward and upward from an outer circumferential surface of the reservoir cylinder 190, that is, from an outer circumferential surface of the front tube portion 196. Specifically, the front wall surface 261 is formed such that an inclination angle θ1 of the front wall surface 261 with respect to the outer circumferential surface of the front tube portion 196 becomes an acute angle smaller than 90 degrees, for example, 65 degrees in a side view of the reservoir cylinder 190.

Moreover, a first curved surface part 265 recessed rearward in a side view of the reservoir cylinder 190 is formed in a connected portion between the front wall surface 261 and the outer circumferential surface of the front tube portion 196. In the illustrated example, the first curved surface part 265 has a recessed curved surface shape having a curvature radius of 2 mm in a side view of the reservoir cylinder 190.

A connected portion between the front wall surface 261 and the top wall surface 263 is a curved surface part having a curvature radius of 0.5 mm in a side view of the reservoir cylinder 190. The curvature radius of this curved surface part is not limited to 0.5 mm and may be suitably changed.

The rear wall surface 262 is an inclined surface inclined to extend forward and upward from the outer circumferential surface of the reservoir cylinder 190, that is, from an outer circumferential surface of the rear tube portion 197 in a side view of the reservoir cylinder 190. Specifically, the rear wall surface 262 is formed such that an inclination angle θ2 of the rear wall surface 262 with respect to the outer circumferential surface of the rear tube portion 197 becomes an acute angle smaller than 90 degrees, for example, 45 degrees in a side view of the reservoir cylinder 190.

Moreover, a second curved surface part 266 recessed forward in a side view of the reservoir cylinder 190 is formed in a connected portion between the rear wall surface 262 and the outer circumferential surface of the rear tube portion 197. In the illustrated example, the second curved surface part 266 has a recessed curved surface shape having a curvature radius of 2 mm in a side view of the reservoir cylinder 190.

A connected portion between the rear wall surface 262 and the top wall surface 263 is a curved surface part having a curvature radius of 0.5 mm in a side view of the reservoir cylinder 190. The curvature radius of this curved surface part is not limited to 0.5 mm and may be suitably changed.

Moreover, as illustrated in FIGS. 8 and 10 to 12, in the trigger-type liquid sprayer 1A of the present embodiment, a connection reinforcement portion 270 integrally connecting the pipe fitting tube 113*h* and the large diameter portion 113*a* to each other in the radial direction is formed at a rear part of the pipe fitting tube 113*h* of the inner tube 113. Accordingly, the strength of a rear part of the annular connection portion 113*c* can be improved and the rigidity thereof can be enhanced.

Particularly, the connection reinforcement portion 270 is disposed between the pipe fitting tube 113*h* and the large diameter portion 113*a*, has a circular arc shape extending in the circumferential direction in a plan view, and is formed integrally with the annular connection portion 113*c* such that the connection reinforcement portion 270 is connected to the annular connection portion 113*c* from below. Accordingly, the strength of the rear part of the annular connection portion 113*c* can be effectively improved and the rigidity thereof can be enhanced. In addition to this, since the connection reinforcement portion 270 extends in the circumferential direction, the rear part of the pipe fitting tube 113*h* and the large diameter portion 113*a* can be integrally connected to each other over a wider range, and the rigidity of the rear part of the annular connection portion 113*c* can be further enhanced.

Figure 11:
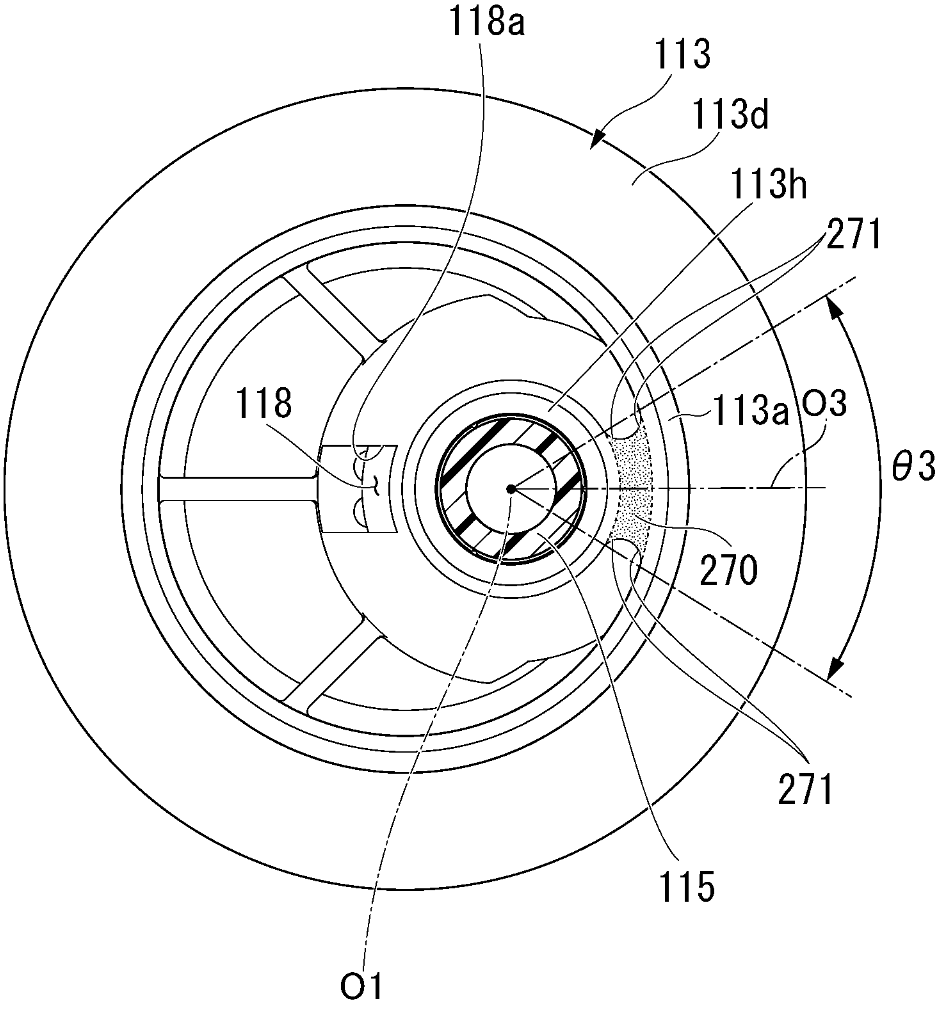
FIG. 11 is a plan view of the inner tube illustrated in FIG. 8 viewed from below.
Figure 12:
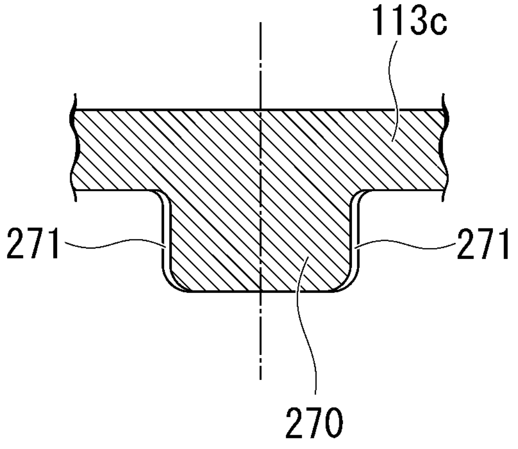
FIG. 12 is a cross-sectional view along arrow line A-A indicated in FIG. 10.

In the present embodiment, as illustrated in FIG. 11, the connection reinforcement portion 270 is formed at the rear part of the pipe fitting tube 113*h*. Moreover, in a plan view, the connection reinforcement portion 270 has a circular arc shape extending toward both sides in the circumferential direction from an imaginary line O3 as a center, and extends over a predetermined formation angle θ3, the imaginary line O3 being orthogonal to the axis O1 in a plan view and extending in the forward/rearward direction. In the illustrated example, the formation angle θ3 is set to 50 degrees.

The formation angle θ3 of the connection reinforcement portion 270 is not limited to 50 degrees. However, the formation angle θ3 is preferably 22 degrees or larger (corresponding to a circumferential width in the circumferential direction of 1.5 mm or longer).

Moreover, in the present embodiment, each of circumferential portions of the connection reinforcement portion 270 is formed with two curved surface parts 271 having a recessed curved surface shape formed to be recessed inward in the circumferential direction in a plan view. One curved surface part 271 is connected to an outer circumferential surface of the pipe fitting tube 113*h*, and the other curved surface part 271 is connected to the inner circumferential surface of the large diameter portion 113*a*. Further, one curved surface part 271 and the other curved surface part 271 are connected to each other.

In the illustrated example, the two curved surface parts 271 have the same curvature radius in a plan view. Specifically, each of the two curved surface parts 271 has a recessed curved surface shape having a curvature radius of 0.65 mm in a plan view.

The curvature radius of the curved surface part 271 is not limited to 0.65 mm. However, it is preferably 0.5 mm or longer.

If the curvature radius of the curved surface part 271 is shorter than 0.5 mm, when the inner tube 113 including the connection reinforcement portion 270 (refer to FIG. 10) in its entirety is injection-molded, the tip of a cast part of a molding cast for molding the connection reinforcing portion 270, that is, the tip of a C-shaped cast part has to be excessively thin, and therefore it is difficult to maintain durability of the cast.

However, the durability of the cast can be maintained by setting the curvature radius of the curved surface part 271 to 0.5 mm or longer.

There is no need for the two curved surface parts 271 to have the same curvature radius in a plan view. For example, the two curved surface parts 271 may have a different curvature radius. Moreover, formation of the circumferential portions of the connection reinforcement portion 270 is not limited to connection between the two curved surface parts 271, and for example, a straight portion may be formed between the two curved surface parts 271 such that the two curved surface parts 271 are connected to each other via the straight portion.

(Operation of Trigger-Type Liquid Sprayer)

Next, a case of using the trigger-type liquid sprayer 1A constituted as described above will be described. Note that the respective parts of the trigger-type liquid sprayer 1A are filled with a liquid by a plurality of times of operations of the trigger portion 151, and the liquid can be sucked up into the vertical supply pipe 110.

After the stopper T illustrated in FIG. 6 is detached, when the trigger portion 151 is operated to be pulled rearward against a biasing force of the coil spring 154, the main piston 152 moves rearward from the foremost position, and the inside of the main cylinder 153 is compressed. Accordingly, a liquid inside the main cylinder 153 is supplied to the inside of the inner tube 113 of the vertical supply tube 110 through the inside of the communication tube portion 153*d*. Then, the liquid supplied to the inner tube 113 presses down the ball valve 119 disposed at the upper end opening edge of the support tube portion 116 and pushes up the valve main body portion 122 of the reservoir valve 120 such that the valve plate portion 122*a* is separated from the upper surface of the valve seat portion 113*e*.

Accordingly, a liquid inside the vertical supply tube 110 can be supplied to the storage space 190*a* of the reservoir cylinder 190 through the penetration hole 113*f*, the penetration hole 131*a*, the inside of the connection tube portion 130, and the supply hole 191 illustrated in FIG. 7 so that the storage space 190*a* can be compressed. For this reason, the reservoir plunger 180 can be moved rearward from the forefront position against a biasing force of the bias member 181 in response to compression of the storage space 190*a* to store (fill) the liquid in the storage space 190*a*.

In an initial stage in which a liquid begins to be introduced into the storage space 190*a*, the liquid enters a gap between the inner circumferential surface of the front lip portion 125*a* and the outer circumferential surface of the front end portion of the plunger tube 125. For this reason, it is easy to move the reservoir plunger 180 rearward.

When the reservoir plunger 180 moves rearward, the closing wall 126 is separated rearward from the front wall portion 192 of the reservoir cylinder 190. Accordingly, the communication hole 195 can be opened, and a high-pressure liquid in the storage space 190*a* can be guided to the spray hole 104 through the communication hole 195 and the inside of the injection tube portion 111. Therefore, the liquid can be sprayed forward through the spray hole 104.

As described above, every time an operation of pulling the trigger portion 151 rearward is performed, a liquid can be sprayed through the spray hole 104, and a liquid can be stored in the storage space 190*a* by moving the reservoir plunger 180 rearward.

After that, when the trigger portion 151 is released, as the main piston 152 is moved back forward inside the main cylinder 153 by the elastic restoring force (biasing force) of the coil spring 154, the trigger portion 151 is moved back forward in conjunction with the movement of the main piston 152. For this reason, the inside of the main cylinder 153 is decompressed such that the pressure in the main cylinder 153 becomes lower than the pressure in the container body A, and thus the ball valve 119 can be separated upward from the upper end opening edge of the support tube portion 116 in a state in which the valve main body portion 122 of the reservoir valve 120 remains being pressed against the upper surface of the valve seat portion 113*e*. Therefore, a liquid inside the container body A can be sucked up into the vertical supply tube 110 and can be introduced into the main cylinder 153 through the inside of the support tube portion 116 and the inside of the communication tube portion 153*d*.

Accordingly, it is possible to prepare for the next spray.

If a rearward operation of the trigger portion 151 is stopped, although supply of a liquid to the storage space 190*a* through the inside of the vertical supply tube 110 and the inside of the connection tube portion 130 stops, the reservoir plunger 180 begins to move forward toward the forefront position due to a biasing force of the bias member 181.

At this time, outflow of a liquid from the storage space 190*a* to the inside of the vertical supply tube 110 is restricted by the reservoir valve 120.

Accordingly, a liquid accumulated in the storage space 190*a* can be guided to the spray hole 104 through the communication hole 195 and the inside of the injection tube portion 111, and the liquid can be continuously sprayed forward through the spray hole 104.

In this manner, not only when an operation of pulling the trigger portion 151 rearward is performed but also when an operation of the trigger portion 151 is not performed, a liquid can be sprayed, and continuous spraying of a liquid can be performed.

For instance, when an operation of pulling the trigger portion 151 rearward is performed in a state in which the reservoir plunger 180 is positioned at the rearmost position, there is a possibility that a liquid may be excessively supplied to the storage space 190*a* and liquid leakage, breakage of each portion, or the like may occur.

In the present embodiment, when the reservoir plunger 180 moves rearward to a certain extent, the front lip portion 125*a* reaches the communication grooves 194 so that the inside of the storage space 190*a* communicates with the inside of the container body A through the communication grooves 194, the recovery hole 199, and the recovery path 117. Namely, when the reservoir plunger 180 moves rearward, the inside of the storage space 190*a* and the inside of the container body A can communicate with each other utilizing the recovery path 117.

Therefore, a part of a liquid inside the storage space 190*a* can be returned to the inside of the container body A, and excessive supply of a liquid to the inside of the storage space 190*a* can be curbed. Accordingly, excessive increase in pressure inside the storage space 190*a* can be curbed, and occurrence of liquid leakage, breakage of each portion, or the like can be curbed.

As described above, according to the trigger-type liquid sprayer 1A of the present embodiment, not only when an operation of pulling the trigger portion 151 rearward is performed but also when an operation of the trigger portion 151 is not performed, a liquid can be sprayed, and continuous spraying of a liquid can be performed.

The upper end portion of the trigger portion 151 (fulcrum) is pivotally supported by the nozzle member 103 such that the trigger portion 51 is swingable, and the main piston 152 is interlocked with the intermediate portion (point of action) of the trigger portion 151. Therefore, for example, by operating the lower end portion (point of leverage) of the trigger portion 151, the main piston 152 can be efficiently moved utilizing a so-called principle of leverage. For this reason, operability of the trigger portion 151 can be improved.

Moreover, according to the trigger-type liquid sprayer 1A of the present embodiment, as illustrated in FIG. 8, since the connection reinforcement portion 270 integrally connecting the large diameter portion 113*a*, which is fitted into the mouth portion A1 of the container body A, and the pipe fitting tube 113*h* to each other in the radial direction is provided at the rear part of the pipe fitting tube 113*h*, the strength of the rear part of the annular connection portion 113*c* can be improved and the rigidity thereof can be enhanced. Accordingly, for example, even if an impact force due to a drop impact or contact with the outside acts on the reservoir cylinder 190 and the vertical supply tube 110 is displaced so as to warp or tilt, displacement such as warpage of the rear part of the annular connection portion 113*c* can be curbed. Accordingly, occurrence of a flaw such as cracking in the connected portion or the like between the rear part of the annular connection portion 113*c* and the pipe fitting tube 113*h* can be curbed. In addition, since it can be expected that the rigidity of the pipe fitting tube 113*h* be also improved by the connection reinforcement portion 270, occurrence of the foregoing flaw can be curbed.

For example, when an impact force as indicated by Arrow F1 in FIG. 6 acts on the rear end portion of the rear tube portion 197 due to a drop impact or the like, there is a possibility that the rear tube portion 197 may be displaced such that it is folded downward due to a rotation torque or the like caused by the impact force, and the impact force may be transmitted to the vertical supply tube 110 so that the vertical supply tube 110 may be displaced such that it warps or tilts, for example. Similarly, when an impact force acts on the nozzle member 103 as indicated by Arrow F2 in FIG. 6, there is a possibility that the rear tube portion 197 may be displaced such that it is lifted upward due to a rotation torque or the like caused by the impact force, and the impact force may be transmitted to the vertical supply tube 110 so that the vertical supply tube 110 may be displaced such that it warps or tilts, for example.

Even in this case, displacement of the rear part of the annular connection portion 113*c* can be curbed by the connection reinforcement portion 270, and the rigidity of the pipe fitting tube 113*h* can also be improved. Therefore, occurrence of a flaw such as cracking in the connected portion between the rear part of the annular connection portion 113*c* and the pipe fitting tube 113*h* (for example, a root part of the pipe fitting tube 113*h*) can be curbed.

Therefore, the rigidity against an unexpected external force can be enhanced, and the impact resistance of the trigger-type liquid sprayer 1A can be improved. As a result, a high-quality trigger-type liquid sprayer 1A having a high rigidity against a drop impact, a contact impact, or the like can be obtained. Moreover, since the impact resistance can be improved, a larger internal volume (internal capacity) inside the reservoir cylinder 190 can be secured, for example, by forming the rear tube portion 197 to extend rearward beyond the vertical supply tube 110. Accordingly, more liquid can be reserved inside the reservoir cylinder 190 and a trigger-type liquid sprayer 1A suitable for continuous injection can be obtained.

As described above, according to the trigger-type liquid sprayer 1A of the present embodiment, since the connection reinforcement portion 270 is provided, the trigger-type liquid sprayer 1A having an excellent impact resistance can be obtained.

Moreover, the connection reinforcement portion 270 is formed between the pipe fitting tube 113*h* and the large diameter portion 113*a*, has a circular arc shape extending in the circumferential direction in a plan view, and is integrally connected to the annular connection portion 113*c* from below.

Therefore, the strength of the rear part of the annular connection portion 113*c* can be effectively improved and the rigidity thereof can be enhanced. In addition to this, since the connection reinforcement portion 270 extends in the circumferential direction, the rear part of the pipe fitting tube 113*h* and the large diameter portion 113*a* can be integrally connected to each other over a wider range, and therefore the rigidity of the rear part of the annular connection portion 113*c* can be further enhanced. For this reason, occurrence of a flaw such as cracking in the root part of the pipe fitting tube 113*h* or the like can be effectively curbed.

Moreover, according to the trigger-type liquid sprayer 1A of the present embodiment, as illustrated in FIG. 9, the upper rib 260 is formed in the reservoir cylinder 190. Moreover, the front wall surface 261 of the upper rib 260 is an inclined surface having the inclination angle θ1 of 65 degrees with respect to the outer circumferential surface of the front tube portion 196 of the reservoir cylinder 190, instead of a vertical surface forming, for example, a right angle. In addition to this, the first curved surface part 265 is formed in the connected portion between the front wall surface 261 and the outer circumferential surface of the front tube portion 196.

Similarly, the rear wall surface 262 of the upper rib 260 is an inclined surface having the inclination angle θ2 of 45 degrees with respect to the outer circumferential surface of the rear tube portion 197 of the reservoir cylinder 190, and the second curved surface part 266 is formed in the connected portion between the rear wall surface 262 and the outer circumferential surface of the rear tube portion 197.

Accordingly, for example, even if an impact force due to a drop or the like acts on the reservoir cylinder 190 and the reservoir cylinder 190 is displaced such that it is folded in the upward/downward direction due to a rotation torque or the like caused by this, occurrence of a flaw such as cracking in the connected portions between the reservoir cylinder 190, and the front wall surface 261 and the rear wall surface 262 can be curbed.

Moreover, according to the trigger-type liquid sprayer 1A of the present embodiment, the lower end portion of the recovery path 117 is closed from below by the annular connection portion 113*c* of the inner tube 113. Therefore, even if an impact force acts on the trigger-type liquid sprayer 1A and a high load is generated at the rear part of the vertical supply tube 110, a flaw such as breakage of the vertical supply tube 110 starting from the lower end portion of the recovery path 117 is unlikely to occur. Particularly, since the strength of the annular connection portion 113*c* closing the lower end portion of the recovery path 117 is improved by the connection reinforcement portion 270, the foregoing flaw is unlikely to occur.

Moreover, in the trigger-type liquid sprayer 1A of the present embodiment, as illustrated in FIG. 6, the displacement curbing portion 250 for curbing displacement of the rear tube portion 197 with respect to the vertical supply tube 110 is provided between the rear tube portion 197 of the reservoir cylinder 190 and the vertical supply tube 110. Therefore, even if a drop impact or the like acts on the reservoir cylinder 190, displacement (deformation) of the rear tube portion 197, for example, in the upward/downward direction can be curbed.

Therefore, even if an external force as indicated by Arrow F1 in FIG. 6 acts on the rear end portion side of the rear tube portion 197 due to the drop impact or the like, by providing the displacement curbing portion 250, displacement in which the rear tube portion 197 is folded downward can be curbed. Accordingly, the rigidity against an unexpected external force can be enhanced, and the impact resistance of the trigger-type liquid sprayer 1A can be improved. Moreover, since a load on the upper rib 260 and the connection reinforcement portion 270 can be reduced, occurrence of cracking or the like can be effectively curbed.

Moreover, since the reinforcement rib 251 having a longitudinal rib shape integrally connects the vertical supply tube 110 and the rear tube portion 197 to each other, the rigidity of the connected portion between the vertical supply tube 110 and the rear tube portion 197 can be effectively enhanced. For this reason, even if an external force as indicated by Arrow F2 in FIG. 6 acts on the nozzle member 103 due to a drop impact or the like, displacement in which the rear tube portion 197 is lifted upward due to a rotation torque or the like can be effectively curbed.

Moreover, in the trigger-type liquid sprayer 1A of the present embodiment, the nozzle member 103 is assembled to the sprayer main body 102 by externally fitting the mounting tube portion 220 to the injection tube portion 111. Moreover, as the mounting tube portion 220 is externally fitted to the injection tube portion 111, the second connection plate 224 overlaps the first connection plate 210 from below in a state in which the interlock protrusion 226 is interlocked with the interlock hole 211 from behind, and the second connection plate 224 is sandwiched between the first connection plate 210 and the injection tube portion 111 in the upward/downward direction.

Therefore, detachment of the nozzle member 103 such as relative forward movement of the nozzle member 103 with respect to the injection tube portion 111 can be curbed, and displacement of the nozzle member 103 in the upward/downward direction with respect to the sprayer main body 102 can be curbed.

Hereinabove, preferable embodiments of the present invention have been described, but the present invention is not limited to these embodiments. Addition, omission, replacement, and other changes of the constituents can be made within a range not departing from the gist of the present invention. The present invention is not limited by the foregoing description and is only limited by the accompanying claims.

Regarding the biasing member for biasing the trigger portion 51 or 151 and the piston (main piston) 52 or 152 forward, in place of the coil spring 54 or 154, for example, a pair of resin springs may be provided on both sides of the injection tube portion 11 or 111 so as to sandwich the injection tube portion 11 or 111 therebetween in the leftward/rightward direction and be connected to the trigger portion 51 or 151.

For example, the trigger portion 51 or 151 configured to be slidably movable in a linear manner may be provided.

In the embodiments described above, a constitution in which the reservoir plunger 80 or 180 closes the communication hole 95 or 195 and when the reservoir plunger 80 or 180 moves rearward against the bias member 81 or 181, the communication hole 95 or 195 is opened has been described, but it is not limited to this constitution. For example, a constitution in which the reservoir plunger 80 or 180 closes the supply hole 91 or 191 formed in the reservoir cylinder 90 or 190 and when the reservoir plunger 80 or 180 moves rearward against the bias member 81 or 181, the supply hole 91 or 191 is opened may be employed.

In the embodiments described above, a constitution in which the nozzle member 3 or 103 is fitted into the injection tube portion 11 or 111 has been described, but it is not limited to this constitution. For example, the nozzle member 3 or 103 may be directly connected to the front side of the reservoir cylinder 90 or 190.

In the embodiments described above, the communication opening 18*a* or 118*a* is formed by the lower end portion of the residual pressure release path 18 or 118, but it is not limited to this constitution. For example, the communication opening 18*a* or 118*a* may be an opening independent from the residual pressure release path 18 or 118.

In the embodiments described above, the communication opening 18*a* or 118*a* is disposed in the front end portion of the vertical supply tube 10 or 110, but it is not limited to this constitution. The communication opening 18*a* or 118*a* may not be provided in the front end portions of the vertical supply tube 10 or 110, and other constitutions in which the communication opening 18*a* or 118*a* is disposed in front of the recovery path 17 or 117 may be employed. For example, the communication opening 18*a* or 118*a* may be provided in the side end portion (end portion in the leftward/rightward direction) of the vertical supply tube 10 or 110. In this case, it is preferable that the communication opening 18*a* or 118*a* be provided in only one of two side end portions of the vertical supply tube 10 or 110. In addition, in this case, it is preferable that not only the lower end portion of the recovery path 17 or 117 but also the lower end portion of the residual pressure release path 18 or 118 be closed from below. In this case, a constitution in which by a second communication path (not illustrated) extending in the circumferential direction (rearward) of the vertical supply tube 10 or 110 from the residual pressure release path 18 or 118 is provided and the residual pressure release path 18 or 118 communicates with the inside of the container body A through the second communication path and the communication opening 18*a* or 118*a* may be employed.

In the embodiments described above, a constitution in which the reservoir cylinder 90 or 190 protrudes rearward from the vertical supply tube 10 or 110 has been described, but it is not limited to this constitution. The reservoir cylinder 90 or 190 may protrude in the upward/downward direction or the leftward/rightward direction from the vertical supply tube 10 or 110. In addition, the reservoir cylinder 90 or 190 may be formed such that the protruding amount thereof from the vertical supply tube 10 or 110 is smaller and the outer diameter thereof is larger.

In the second embodiment, the connection reinforcement portion 270 has a circular arc shape extending in the circumferential direction in a plan view, but it is not limited to this case. For example, the connection reinforcement portion 270 may have a slender bridge shape extending in the radial direction. Moreover, a plurality of bridge-shaped connection reinforcement portions may be formed with an interval therebetween in the circumferential direction.

Furthermore, within a range not departing from the gist of the present invention, the constituent elements in the foregoing embodiments can be suitably replaced with known constituent elements. In addition, the foregoing modification examples may be suitably combined.

INDUSTRIAL APPLICABILITY

According to the present invention, it is possible to provide a trigger-type liquid sprayer in which an impact resistance can be improved.

REFERENCE SIGNS LIST

1, 1A Trigger-type liquid sprayer
2, 102 Sprayer main body
3, 103 Nozzle member
4, 104 Spray hole
10, 110 Vertical supply tube
12, 112 Outer tube
13, 113 Inner tube
13*a*, 113*a* Large diameter portion
13*b*, 113*b* Small diameter portion
13*c*, 113*c* Annular connection portion
17, 117 Recovery path
17*a*, 117*a* Communication path
18, 118 Residual pressure release path
18*a*, 118*a* Communication opening
33, 133 Reception member
34, 134 Reception tube
50, 150 Trigger mechanism
51, 151 Trigger portion
52, 152 Main piston
53, 153 Main cylinder
80, 180 Reservoir plunger
81, 181 Bias member

90, 190 Reservoir cylinder
95, 195 Communication hole
113*h* Pipe fitting tube
270 Connection reinforcement portion
A Container body
O1 Axis
O2 Axis

What is claimed is:

1. A trigger-type liquid sprayer comprising:
a sprayer main body mounted on a container body configured to accommodate a liquid therein; and
a nozzle member having a spray hole for spraying a liquid forward, the nozzle member being mounted on a front end portion of the sprayer main body,
wherein the sprayer main body includes:
a vertical supply tube extending in an upward/downward direction and configured to suck up a liquid in the container body;
a trigger mechanism having a trigger portion disposed in front of the vertical supply tube to be movable rearward in a state in which the trigger portion is biased forward, the trigger mechanism being configured to cause the liquid to flow from an inside of the vertical supply tube toward the spray hole in response to rearward movement of the trigger portion;
a reservoir cylinder into which a liquid that has passed through the inside of the vertical supply tube is supplied in response to rearward movement of the trigger portion; and
a reservoir plunger disposed inside the reservoir cylinder to be movable in an axial direction along a center axis of the reservoir cylinder, and configured to move toward one side in the axial direction in response to supply of the liquid into the reservoir cylinder while being biased toward the other side in the axial direction by a bias member, and
the vertical supply tube has:
a recovery path disposed in a rear end portion of the vertical supply tube, extending downward from the reservoir cylinder, and having a lower end portion closed from below and an upper end that opens upward;
a communication path extending in a circumferential direction of the vertical supply tube from the recovery path; and
a communication opening disposed in front of the recovery path and configured to allow the communication path and the inside of the container body to communicate with each other.

2. The trigger-type liquid sprayer according to claim 1, wherein the communication opening is disposed in a front end portion of the vertical supply tube.

3. The trigger-type liquid sprayer according to claim 1, wherein the trigger mechanism includes
a main piston configured to move forward and rearward in response to movement of the trigger portion, and
a main cylinder inside of which is compressed and decompressed in response to movement of the main piston, the inside of the main cylinder communicating with the inside of the vertical supply tube,
a residual pressure release path extending downward from the main cylinder and opening inside the container body is provided in the front end portion of the vertical supply tube,
the communication path is configured to allow the recovery path and the residual pressure release path to communicate with each other, and
the communication opening is formed by a lower end portion of the residual pressure release path.

4. The trigger-type liquid sprayer according to claim 1, wherein the vertical supply tube includes
an outer tube, and
an inner tube fitted into the outer tube, and
the recovery path and the communication path are provided between the outer tube and the inner tube.

5. The trigger-type liquid sprayer according to claim 1, wherein the reservoir cylinder is disposed above the vertical supply tube, intersects a center axis of the vertical supply tube, and protrudes toward one side in the axial direction beyond the vertical supply tube,
the vertical supply tube includes an outer tube formed integrally with the reservoir cylinder and an inner tube fitted into the outer tube,
the inner tube includes:
a large diameter portion fitted into a mouth portion of the container body;
a small diameter portion which is disposed inside the large diameter portion in a radial direction and into which a pipe for sucking up a liquid from the container body is fitted; and
an annular connection portion connecting an inner circumferential surface of the large diameter portion and an outer circumferential surface of the small diameter portion to each other in the radial direction,
an annular pipe fitting tube protruding downward from the annular connection portion is formed in the small diameter portion, and
a connection reinforcement portion integrally connecting the pipe fitting tube and the large diameter portion to each other in the radial direction is formed at a rear part of the pipe fitting tube.

6. The trigger-type liquid sprayer according to claim 5, wherein the connection reinforcement portion is connected to the annular connection portion from below.

7. The trigger-type liquid sprayer according to claim 5, wherein the connection reinforcement portion is formed between the pipe fitting tube and the large diameter portion and extends in the circumferential direction.

8. The trigger-type liquid sprayer according to claim 1, wherein the trigger mechanism includes
a main piston configured to move forward and rearward in response to movement of the trigger portion, and
a main cylinder inside of which is compressed and decompressed in response to movement of the main piston, the inside of the main cylinder communicating with the inside of the vertical supply tube,
a residual pressure release path extending downward from the main cylinder and opening inside the container body is provided in the front end portion of the vertical supply tube, the residual pressure release path being different from the recovery path, and
the communication path is configured to allow the recovery path and the residual pressure release path to communicate with each other.

* * * * *